United States Patent
Slocum et al.

(10) Patent No.: US 8,411,530 B2
(45) Date of Patent: Apr. 2, 2013

(54) MULTI-FREQUENCY, MULTI-BEAM ACOUSTIC DOPPLER SYSTEM

(75) Inventors: Daryl B. Slocum, La Mesa, CA (US); Ramon Cabrera, Miami, FL (US); Zhivko Grozev, San Diego, CA (US); Alexander Kovachev, San Diego, CA (US)

(73) Assignee: YSI Incorporated, Yellow Springs, OH (US)

( * ) Notice: Subject to any disclaimer, the term of this patent is extended or adjusted under 35 U.S.C. 154(b) by 384 days.

(21) Appl. No.: 12/639,989

(22) Filed: Dec. 16, 2009

(65) Prior Publication Data

US 2010/0157739 A1    Jun. 24, 2010

Related U.S. Application Data

(63) Continuation-in-part of application No. 12/340,315, filed on Dec. 19, 2008, now Pat. No. 8,125,849.

(60) Provisional application No. 61/162,651, filed on Mar. 23, 2009.

(51) Int. Cl.
   *G01S 15/00* (2006.01)

(52) U.S. Cl. .......................................................... 367/90

(58) Field of Classification Search ..................... 367/90
   See application file for complete search history.

(56) References Cited

U.S. PATENT DOCUMENTS

| | | | |
|---|---|---|---|
| 4,270,191 A | 5/1981 | Peynaud | |
| 5,077,700 A | 12/1991 | Shaw et al. | |
| 5,122,990 A | 6/1992 | Deines et al. | |
| 5,208,785 A | 5/1993 | Brumley et al. | |
| 5,315,562 A | 5/1994 | Bradley et al. | |
| 5,465,622 A | 11/1995 | Freking | |
| 5,515,338 A | 5/1996 | Stedtnitz | |
| 5,515,721 A | 5/1996 | Kim et al. | |

(Continued)

FOREIGN PATENT DOCUMENTS

DE    10 2005 031973    8/2006

OTHER PUBLICATIONS

Wood, J.D. et al., "Monitoring Suspended Sediment Plumes Using an Acoustic Doppler Current Profiler," Oceans 2007, 7 pages, Sep. 29, 2007—Oct. 4, 2007.

(Continued)

*Primary Examiner* — Isam Alsomiri
*Assistant Examiner* — James Hulka
(74) *Attorney, Agent, or Firm* — Thompson Hine L.L.P.

(57) ABSTRACT

An acoustic Doppler system including an acoustic subsystem controller operatively connected to a plurality of acoustic transceivers, with a first of the plurality of acoustic transceivers, operating at a first acoustic frequency, operatively connected to a first group of at least one transducer, and a second of the plurality of acoustic transceivers, operating at a second acoustic frequency, operatively connected to a second group of at least one transducer, where the acoustic subsystem controller includes a digital circuit configured to sample analog signals received from the first and second groups of transducer in pairs having a pair-wise sampling frequency that is four times the operating frequency of associated acoustic transceiver. Also presented is a method of sampling acoustic Doppler signals received from such devices, with samples comprising a pair of values taken with a pair-wise sampling frequency that is four times the operating frequency of associated acoustic transceivers, and the resulting pairs of values being further processed as representative values of the cosine and sine components of a Doppler-shift signal.

10 Claims, 26 Drawing Sheets

U.S. PATENT DOCUMENTS

| | | | |
|---|---|---|---|
| 5,531,125 | A | 7/1996 | Ahn et al. |
| 5,615,173 | A | 3/1997 | Brumley et al. |
| RE35,535 | E | 6/1997 | Brumley et al. |
| 5,694,372 | A | 12/1997 | Perennes |
| 5,777,892 | A | 7/1998 | Nabity et al. |
| 5,952,583 | A | 9/1999 | Chang |
| 6,052,334 | A | 4/2000 | Brumley et al. |
| 6,453,256 | B1 | 9/2002 | Gordon et al. |
| 6,590,831 | B1 | 7/2003 | Bennett et al. |
| 6,714,482 | B2 | 3/2004 | Rowe |
| 6,741,209 | B2 | 5/2004 | Lee |
| 6,820,008 | B1 | 11/2004 | van Smirren et al. |
| 6,983,208 | B2 | 1/2006 | Metcalf et al. |
| 7,267,013 | B2 | 9/2007 | Maier |
| 7,523,658 | B1 | 4/2009 | Polonichko et al. |
| 2003/0076742 | A1 | 4/2003 | Rowe |
| 2008/0080315 | A1 | 4/2008 | Vogt |
| 2008/0094940 | A1 | 4/2008 | Brumley et al. |
| 2008/0156577 | A1 | 7/2008 | Dietz et al. |
| 2008/0239869 | A1 | 10/2008 | Lohrmann et al. |
| 2008/0289433 | A1 | 11/2008 | Lohrmann et al. |
| 2008/0308343 | A1 | 12/2008 | Vogt |

OTHER PUBLICATIONS

Polonichko, V. et al., "Effects of transducer geometry and beam spreading on acoustic Doppler velocity measurements near boundaries," Oceans 2007, 6 pages, Sep. 29, 2007—Oct. 4, 2007.

Lacy, J.R. et al., "Accuracy of a Pulse-Coherent Acoustic Doppler Profiler in a Wave-Dominated Flow," Journal of Atmospheric & Oceanic Technology, vol. 21, p. 1448-1461 (2004).

Spain, P. et al., "Field evaluation of ADCP refinements for profiling shallower waters," Current Measurement Technology, 2003, Proceedings of the IEEE/OES Seventh Working Conference, p. 40-45, Mar. 13-15, 2003.

PCT, International Search Report and Written Opinion, International Application No. PCT/US2010/028081; 16 pages (Jul. 22, 2010).

PCT, International Preliminary Report on Patentability, International Application No. PCT/US2010/028081 (Oct. 6, 2011).

PCT, International Search Report and Written Opinion, International Application No. PCT/US2009/067606, 13 pages (Mar. 9, 2010).

Bonnet, M.P. et al., "Floodplain hydrology in an Amazon floodplain lake (Lago Grande de Curaí)," *Journal of Hydrology*, 349, pp. 18-30 (2008).

Brumley, B. et al., "Performance of a Broad-Band Acoustic Doppler Current Profiler," *IEEE Journal of Oceanic Engineering*, 16, pp. 402-407 (1991).

Oberg, K., "What's New in Hydroacoustics?" United States Geological Survey Training Presentation (on-line), 49 pages (Sep. 2008).

Simpson, M.R. et al., "Discharge-Measurement System Using an Acoustic Doppler Current Profiler with Application to Large Rivers and Estuaries, United States Geological Survey, Water-Supply Paper 2395," 39 pages (1993).

Simpson, M.R., "Discharge Measurements Using a Broad-Band Acoustic Doppler Current Profiler," United States Geological Survey, Open-File Report 01-1 (on-line), 123 pages (2001).

Sloat et al., "Methods and Techniques for Moving Vessel Measurements Using the SonTek ADP, An introduction to discharge measurements and current surveys," Methods and Techniques for Real-Time Discharge Measurements, SonTek/YSI, Inc., San Diego, California, 18 pages (2005).

"Principles of River Discharge Measurement," by SonTek/YSI, Inc., San Diego, California, 7 pages (2003).

CN, Notification of the First Office Action, Chinese Application No. 201080013211.9 (Dec. 5, 2012) (with English translation thereof).

Zheng, X. et al., "Intermediate Frequency Sampling Technology Based on the Hilbert Transform and Hardware Implementation Thereof,"*Transactions of Beijing Institute of Technology*, vol. 24, No. 1 (Jan. 2004) (with English translation thereof).

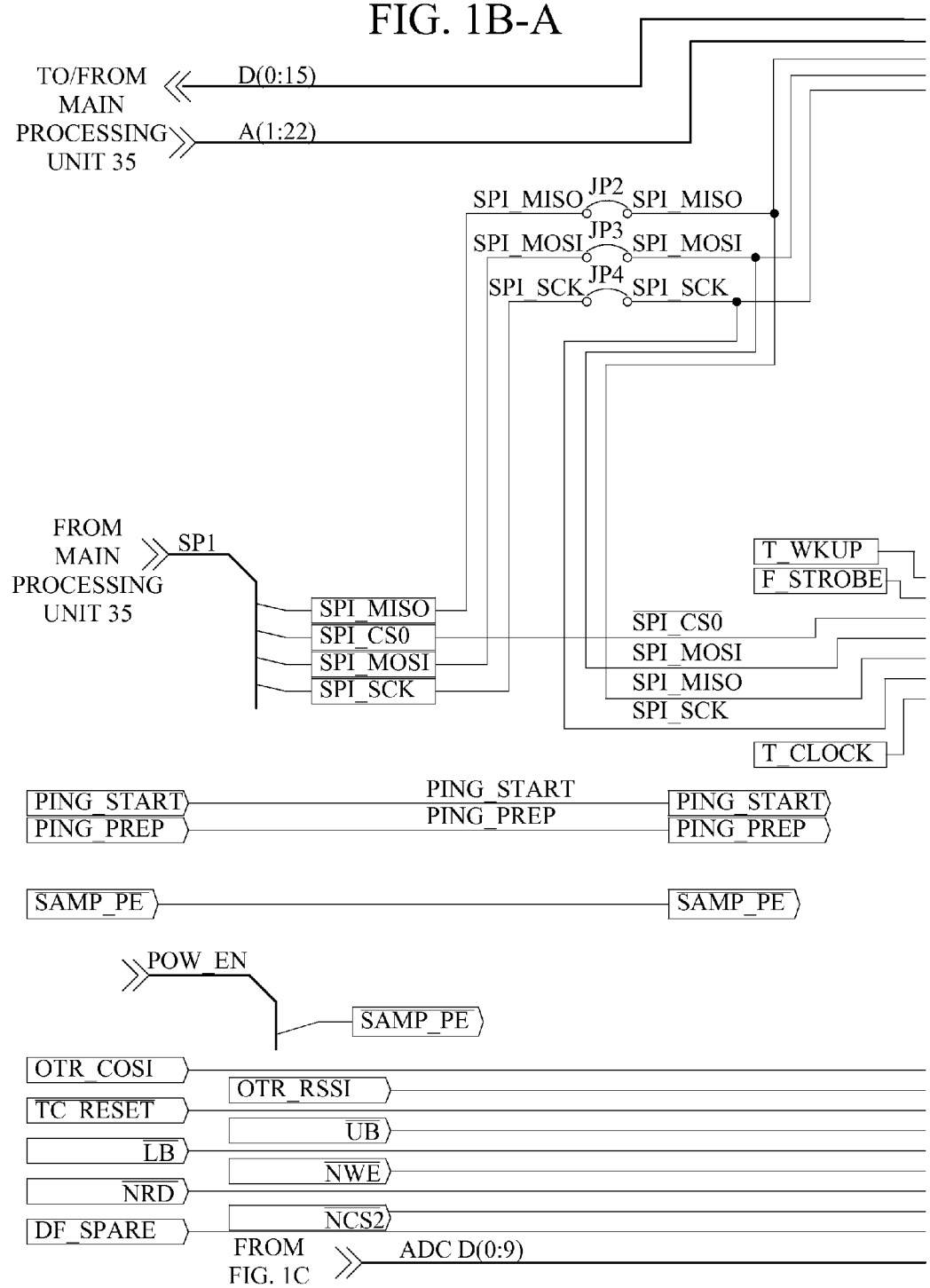

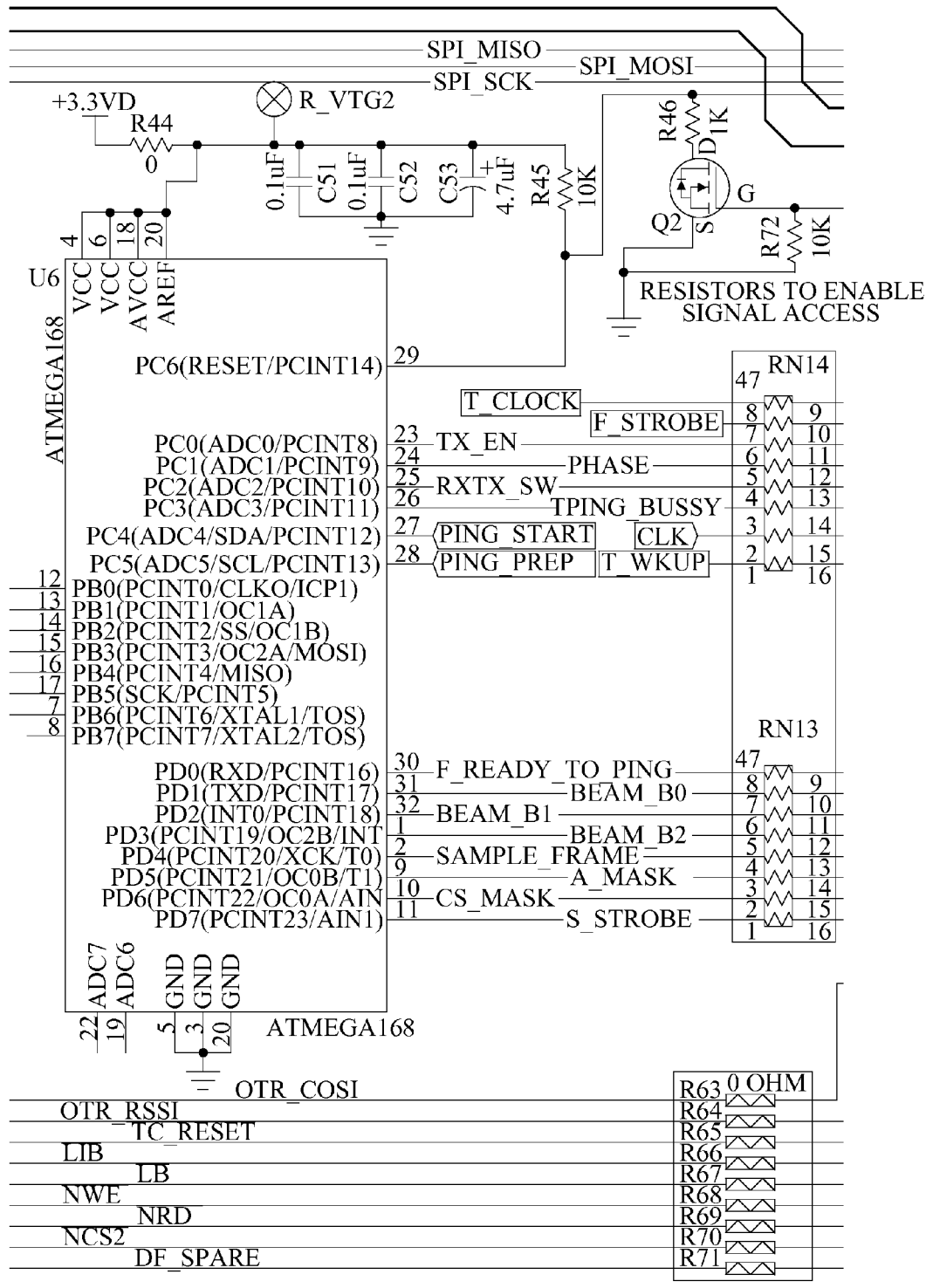
FIG. 1B-B

FIG. 1B-C
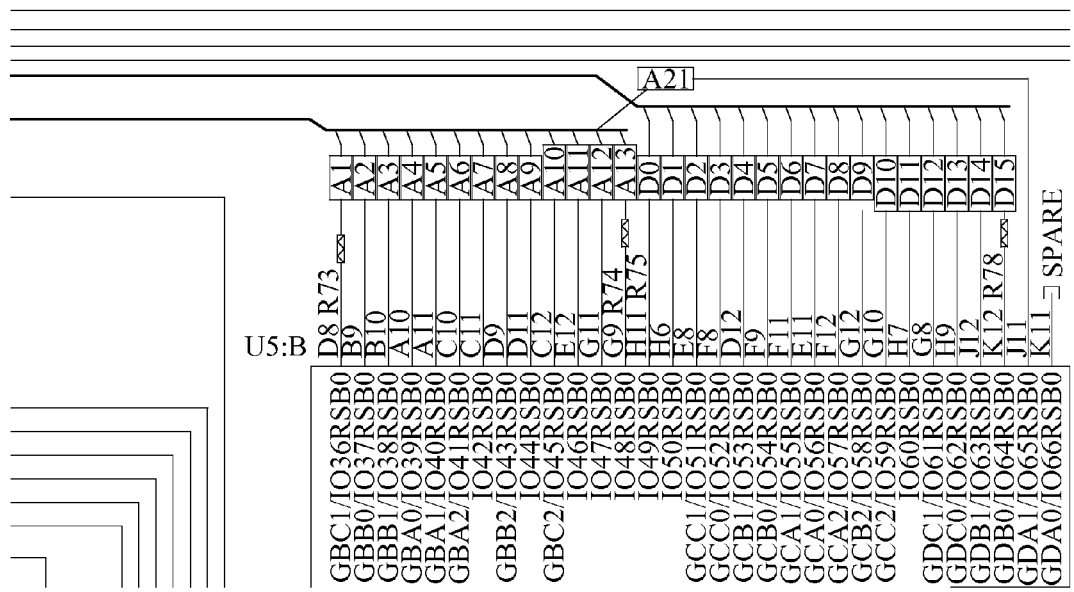

FIG. 1B-D
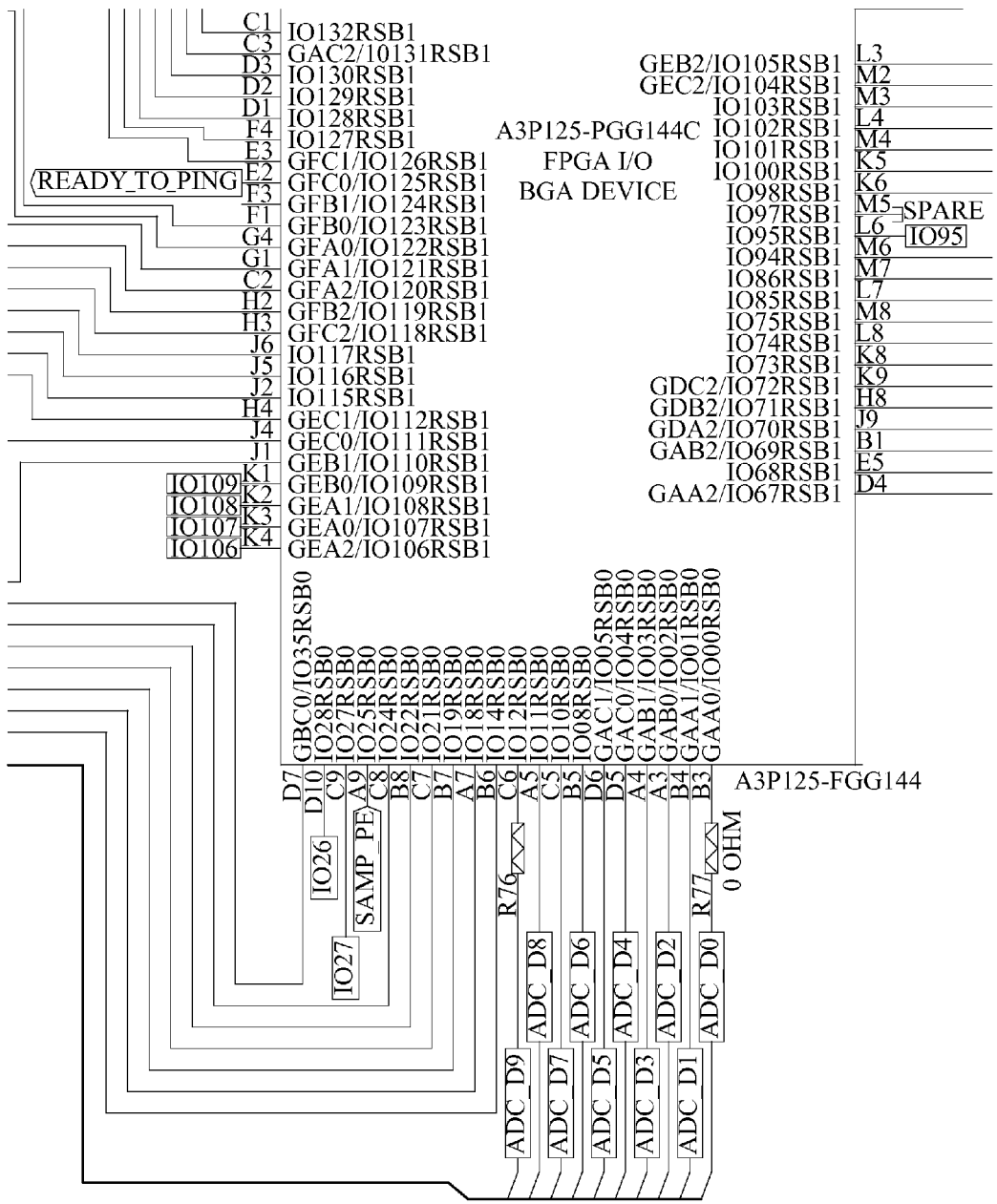

FIG. 1B-E
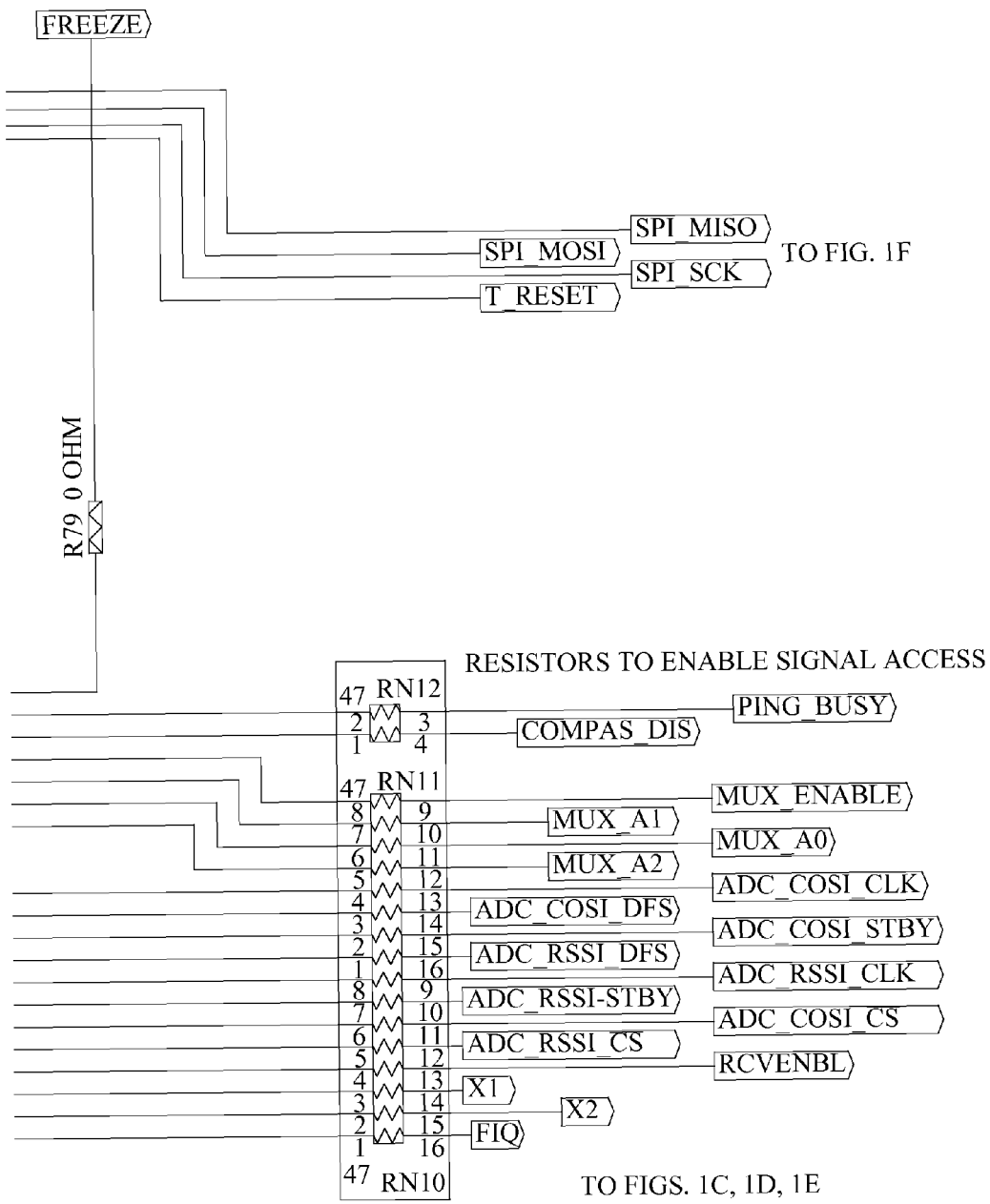

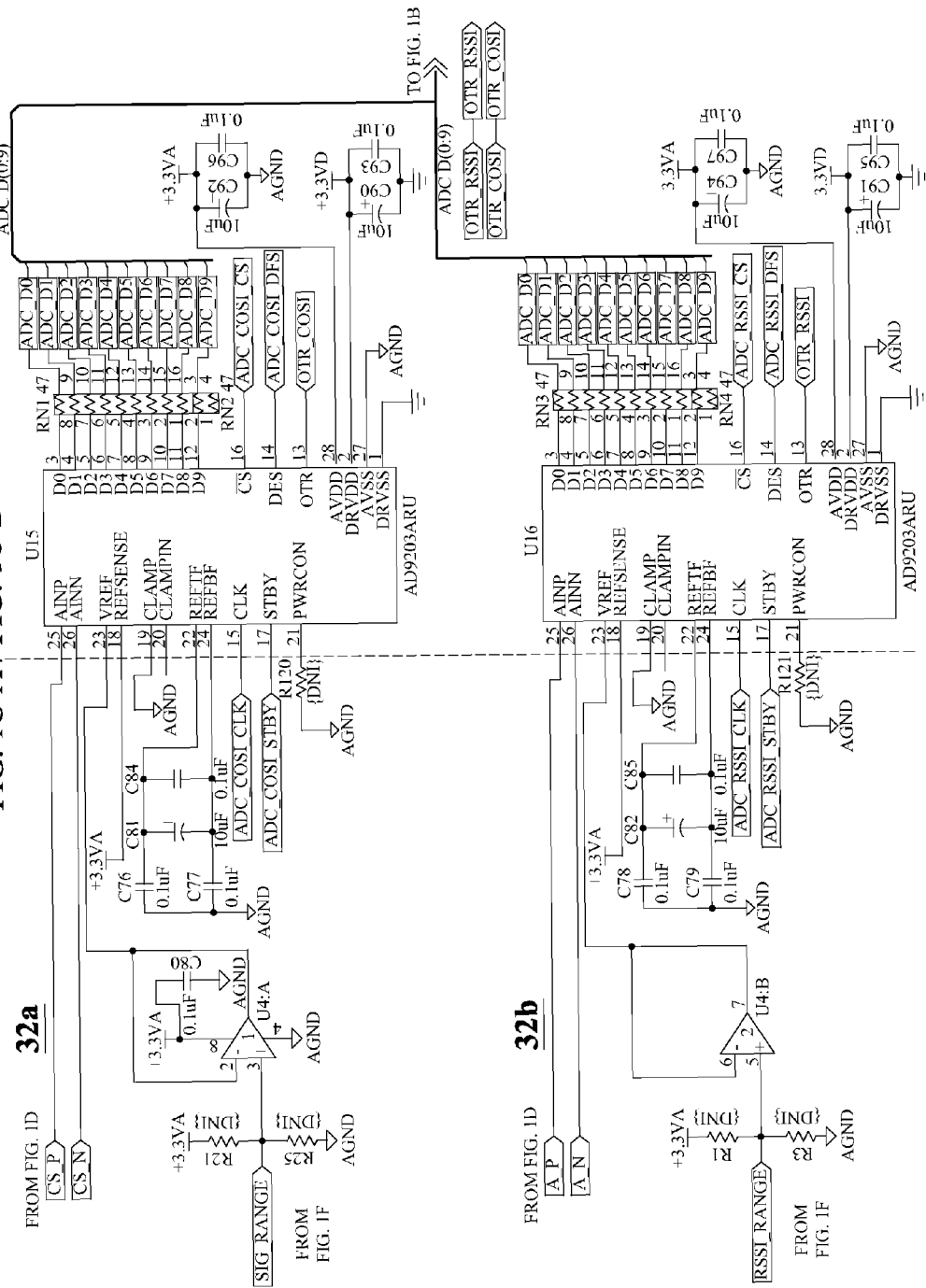

FIG. 1C-A
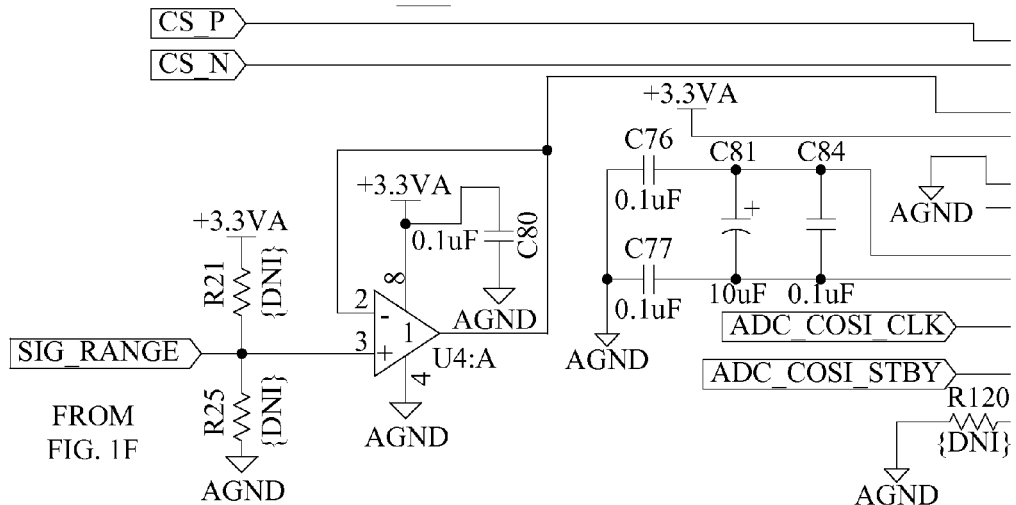
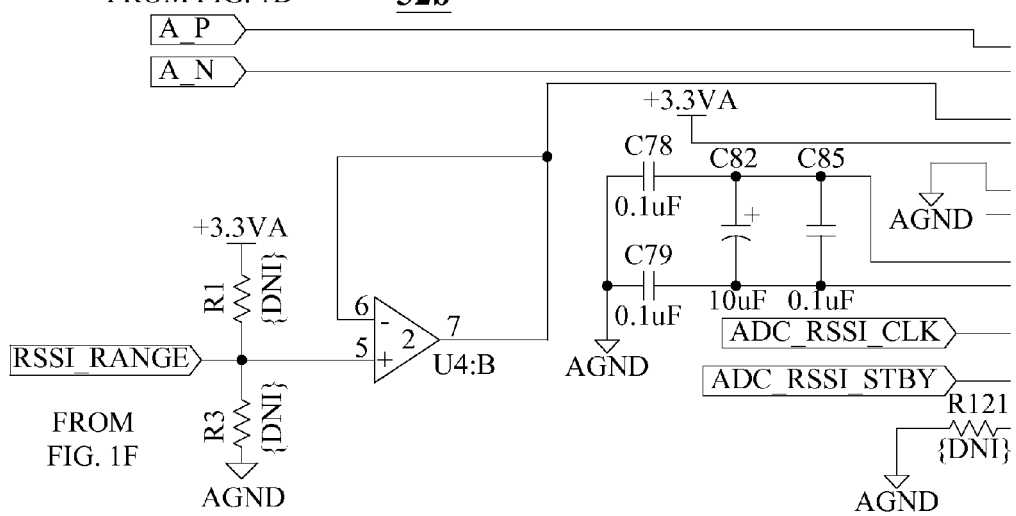

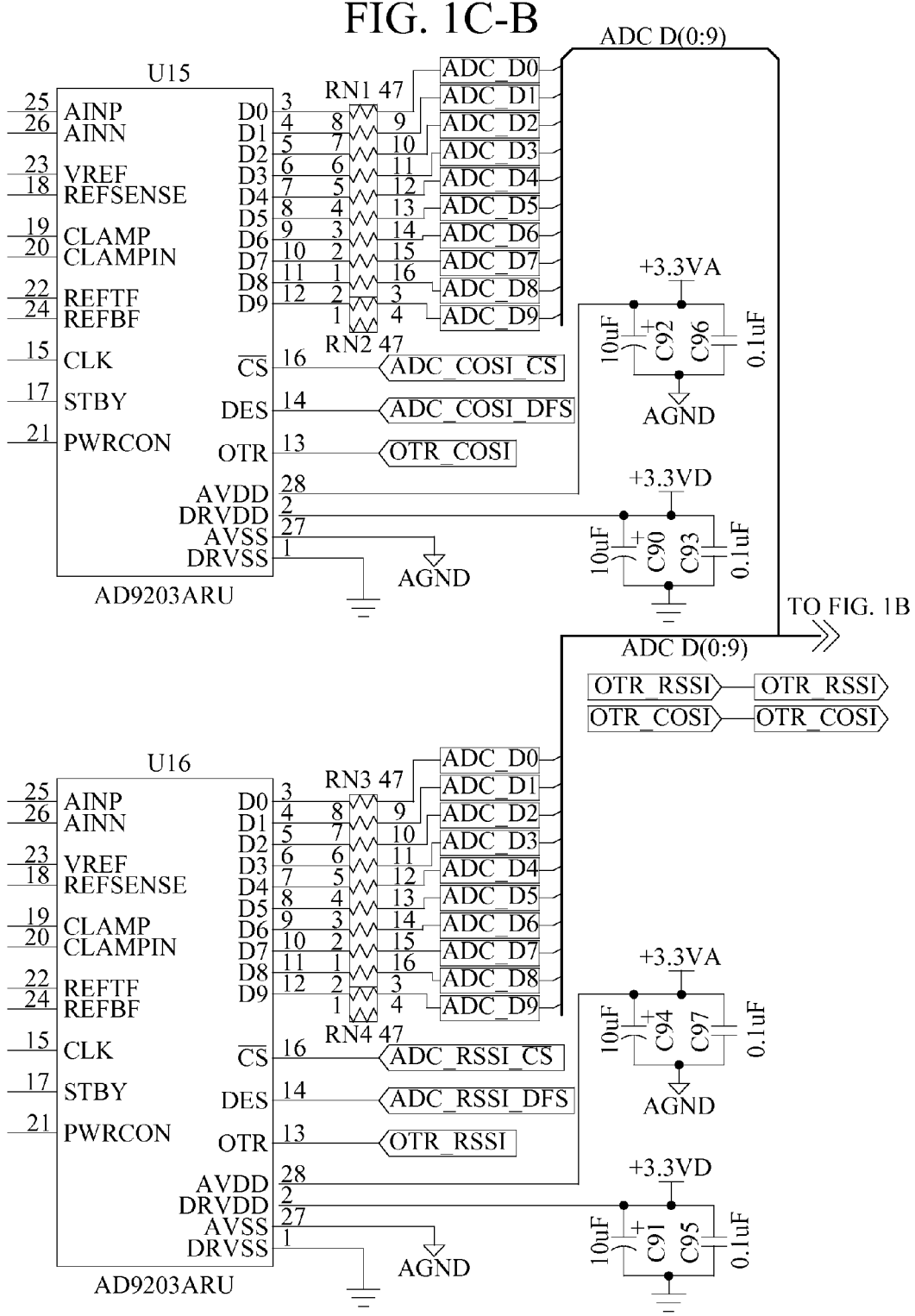
FIG. 1C-B

FIG. 1D-A
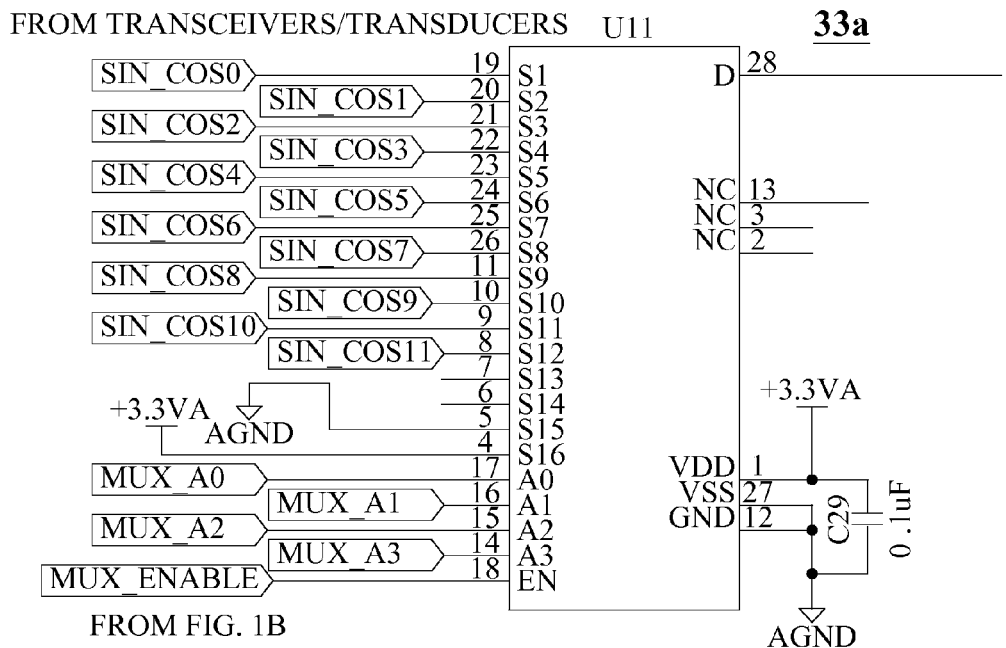
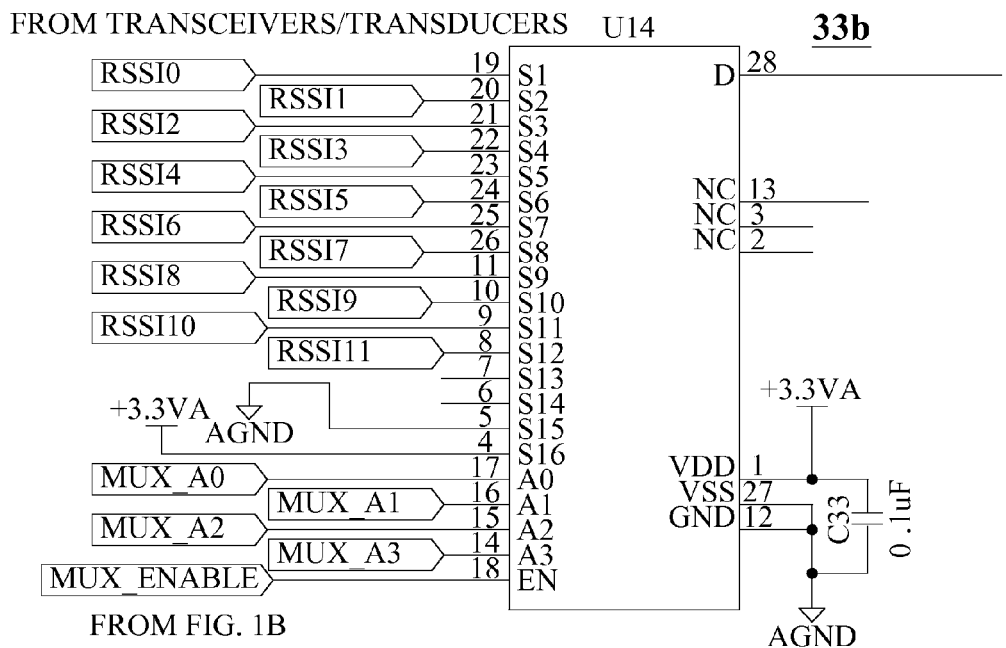

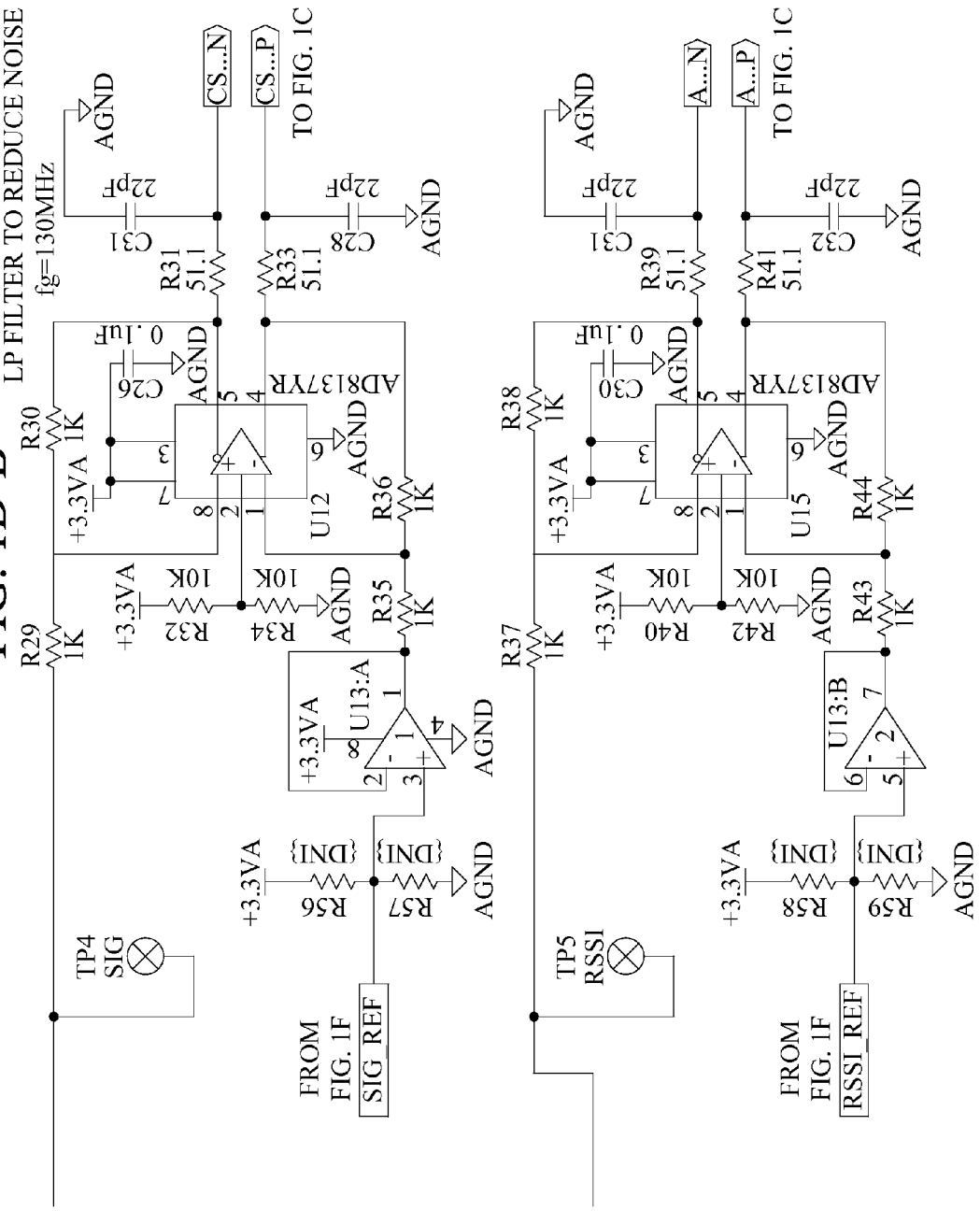

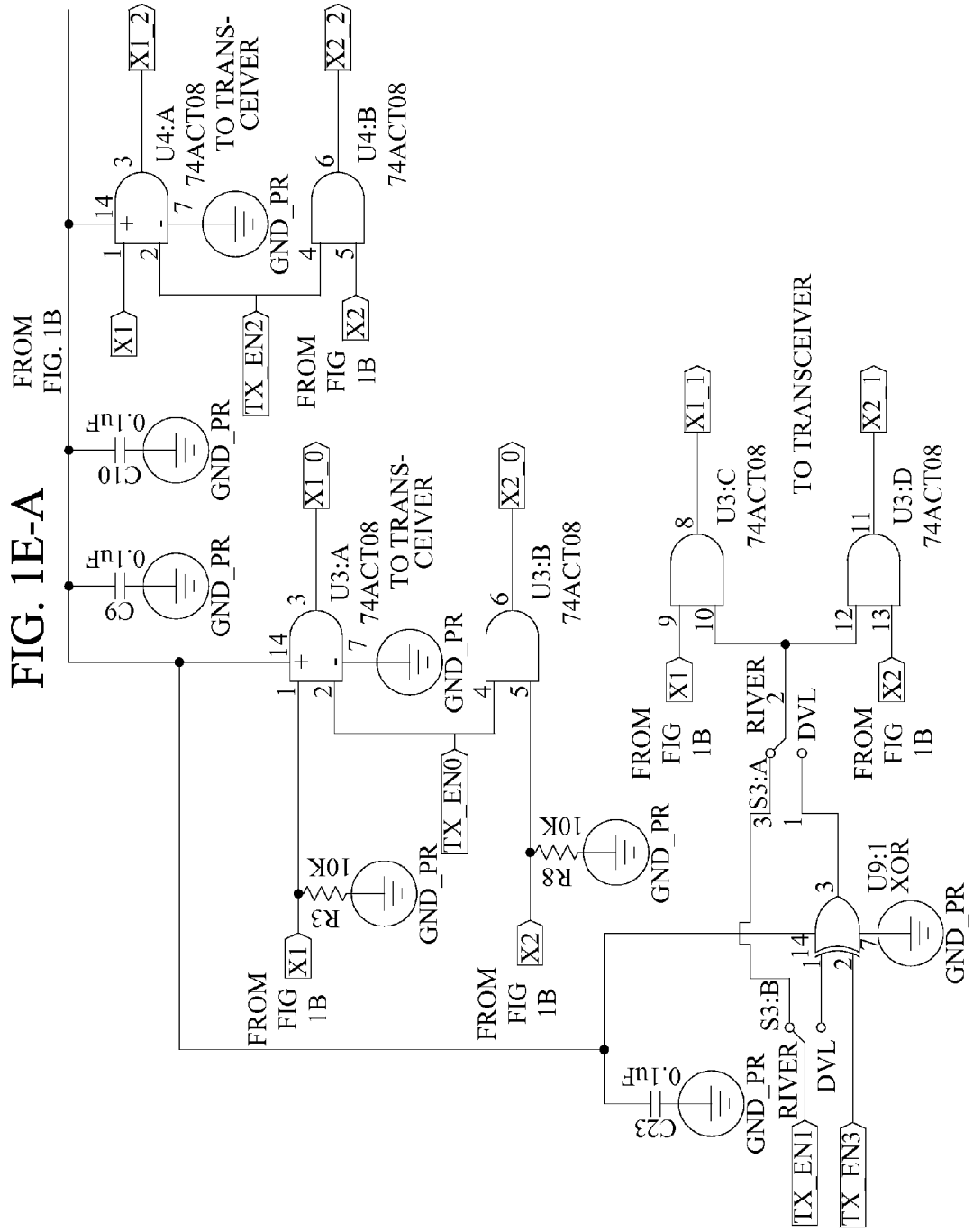

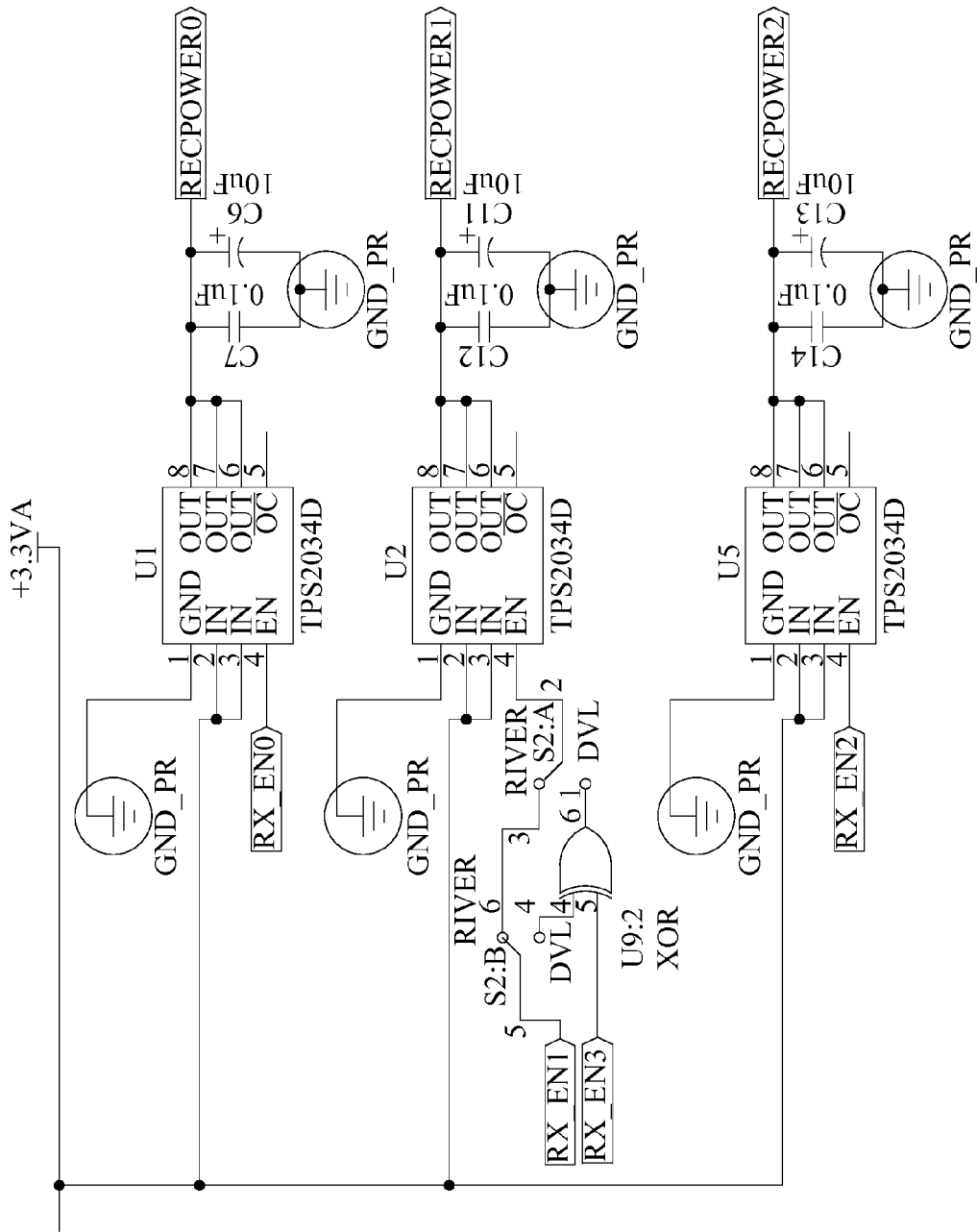
FIG. 1E-B

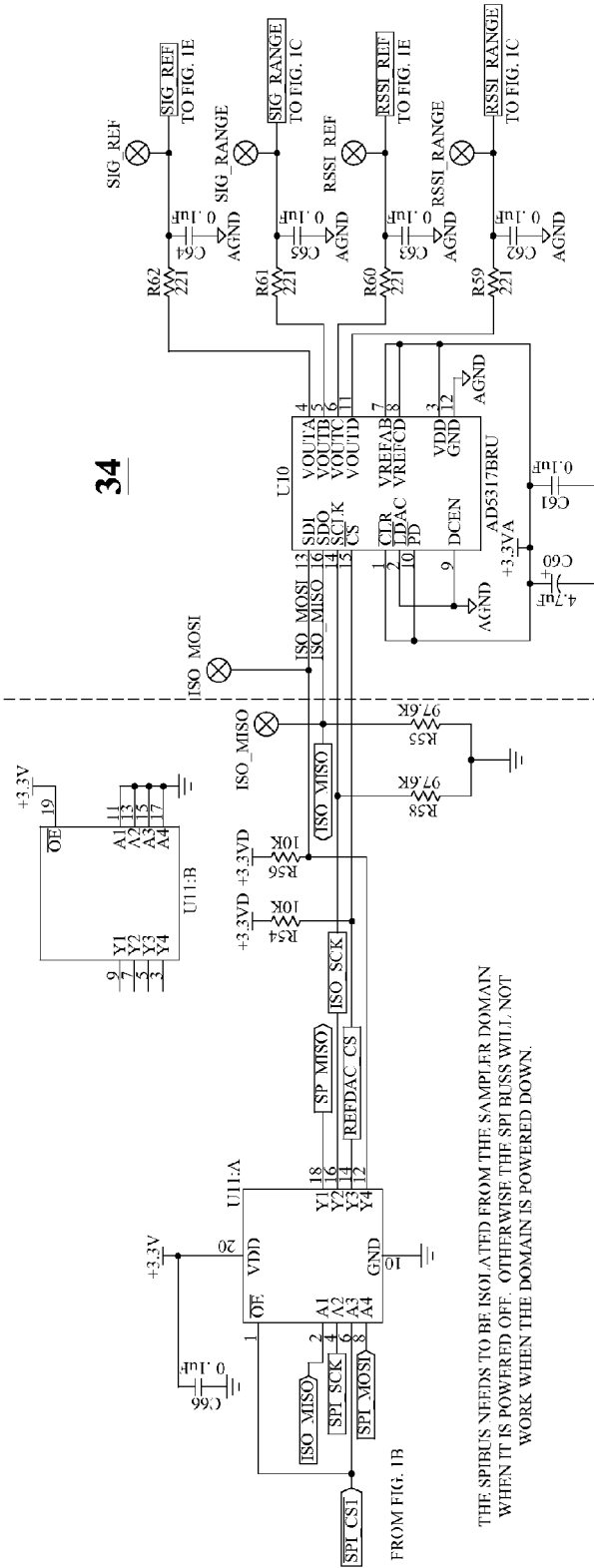

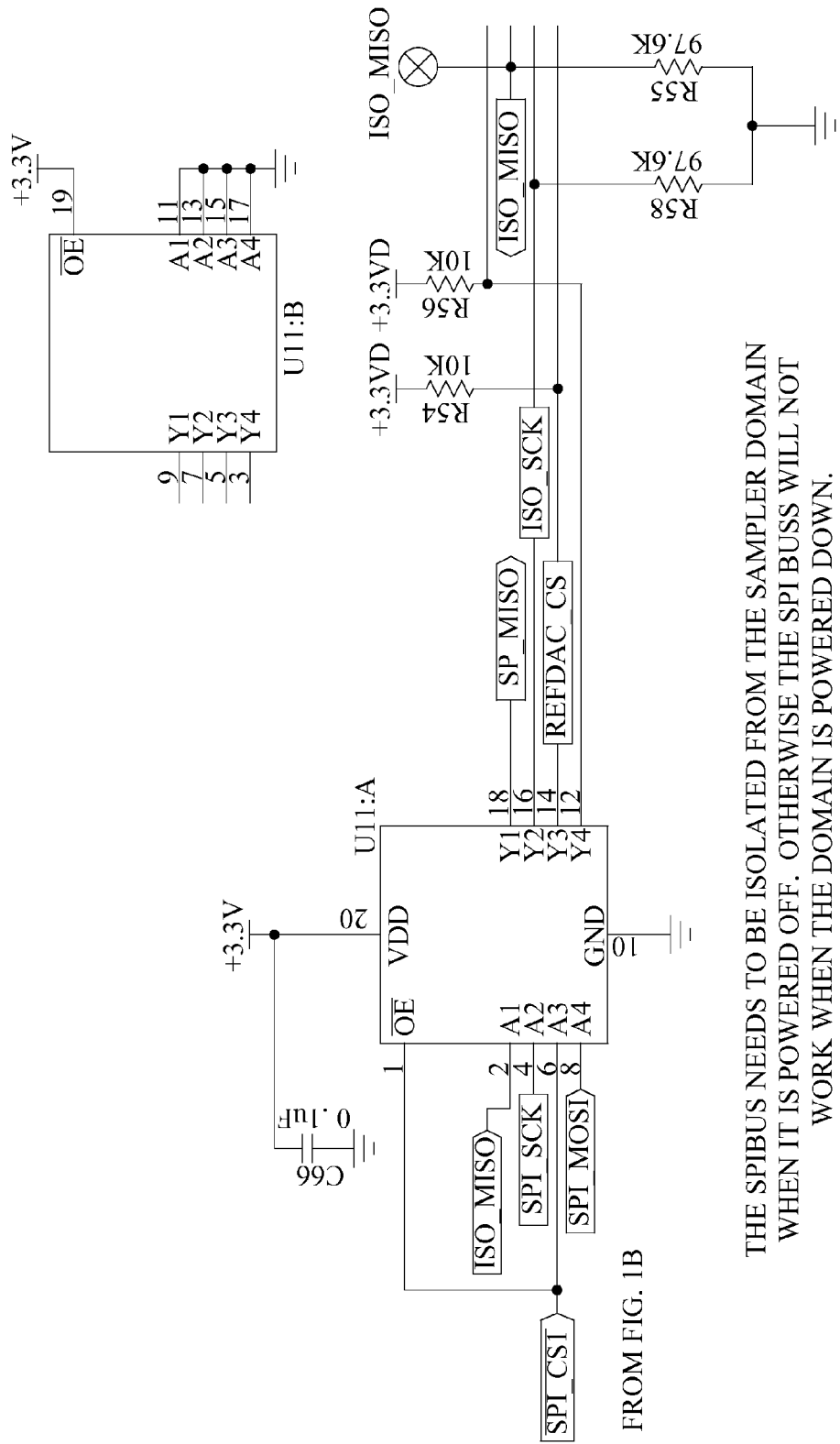

FIG. 1F-B
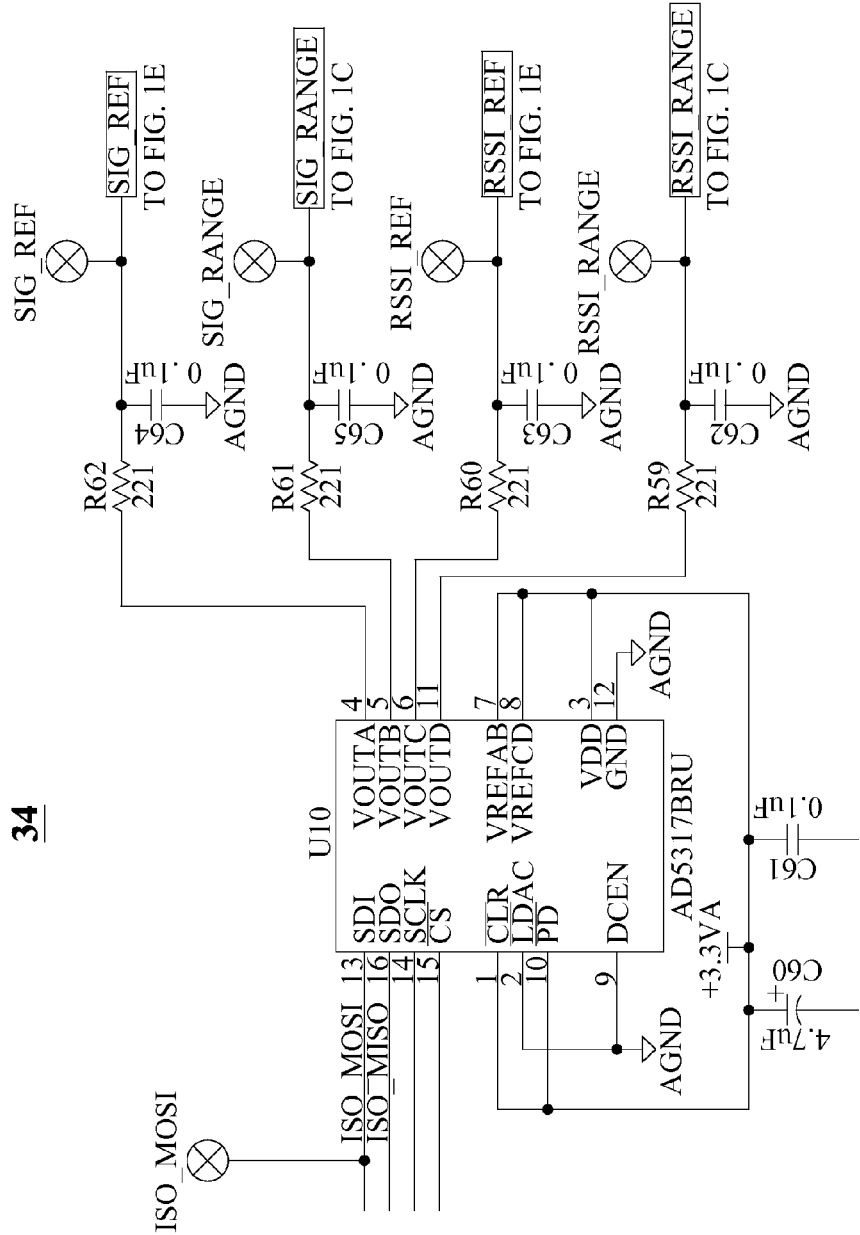

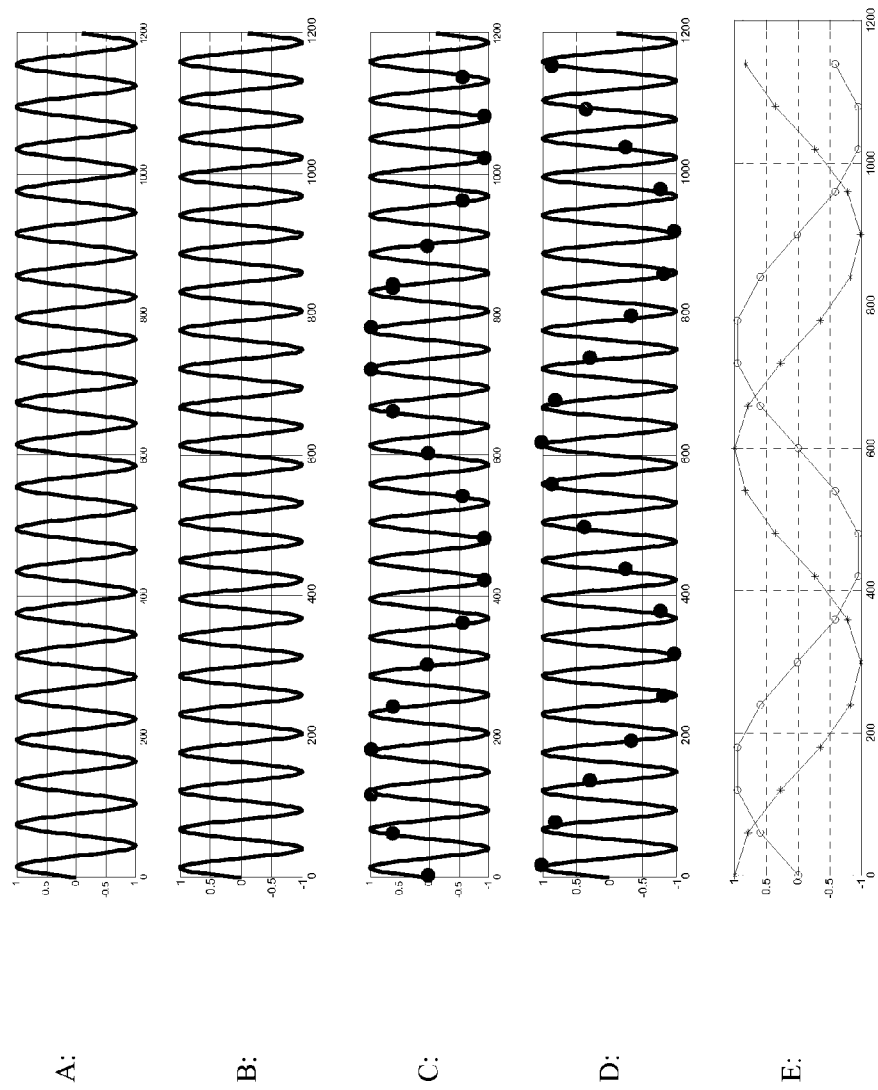

MULTI-FREQUENCY, MULTI-BEAM ACOUSTIC DOPPLER SYSTEM

CROSS-REFERENCES TO RELATED APPLICATIONS

This application claims the benefit of U.S. Provisional Application No. 61/162,651, filed Mar. 23, 2009, the entire contents of which are hereby incorporated by reference, and is a continuation-in-part application of U.S. application Ser. No. 12/340,315, filed Dec. 19, 2008, the entire contents of which are hereby incorporated by reference.

FIELD

Embodiments of the subject matter described herein relate generally to a system and method for operating multiple same-frequency and different-frequency acoustic sensor devices on various aquatic sensor platforms.

SUMMARY

In a general embodiment, the system and method uses an acoustic subsystem comprising an acoustic subsystem controller operatively connected to a plurality of acoustic transceivers, with a first of the plurality of acoustic transceivers, operating at a first acoustic frequency, operatively connected to a first group of at least one transducer, and a second of the plurality of acoustic transceivers, operating at a second acoustic frequency, operatively connected to a second group of at least one transducer. The acoustic subsystem controller is adapted to selectively operate each acoustic transceiver. The acoustic subsystem controller may comprise a digital circuit configured to sample analog signals received from groups of transducers operatively connected to the plurality of acoustic transceivers, the digital circuit sampling the analog signals in pairs having a pair-wise sampling frequency that is four times the operating frequency of the one of the plurality of acoustic transceivers operatively connected to a sampled transducer. The digital circuit may also sample the analog signals received from the sampled transducer with a periodic delay between sampling pairs, the delay being an integer number of periods of the operating frequency of the one of the plurality of the acoustic transceivers. The acoustic subsystem may further comprise a multiplexor adapted to switch a sampled analog channel between multiple individual transducers within the acoustic device.

In a first aspect, the acoustic subsystem is mounted on an aquatic sensor platform, with the first group including a first multi-element transducer array adapted to measure three dimensional motion within a first volume of aquatic environment, and the second group including a first transducer adapted to measure range to an object within a volume of aquatic environment angularly coincident with the first volume. The first transducer may be used to measure depth or altimetry within an aquatic environment.

In a second aspect related to the first, a third of the plurality of acoustic transceivers, operating at a third frequency, is operatively connected to a third group of transducers, with the third group including a multi-element transducer array adapted to measure three dimensional motion within a volume of aquatic environment angularly coincident with the first volume. The third operating frequency may be different than the first operating frequency in order to measure three dimensional motion in alternate environmental conditions.

In a third aspect related to the first, first group may include a second multi-element transducer array adapted to measure three dimensional motion within a second volume of aquatic environment, and the second group may include a second transducer adapted to measure range to an object within a volume of aquatic environment angularly coincident with the second volume, with the first and second volumes being generally oppositely directed from the aquatic sensor platform. The first and second volumes may be located above and below the sensor platform, which may be an autonomous or remotely operated vehicle.

In a fourth aspect related to the first, the second group may include a third transducer adapted to measure range to an object within a third volume of aquatic environment, with the third volume being angularly non-coincident with the first. The third transducer may be used to measure distance from an navigational obstacle or terrain, or in a mapping application.

In an exemplary embodiment, the system and method uses an integrated acoustic transducer system comprising a multi-element transducer array operating at a first frequency for measuring Doppler shifts caused by moving water within a body of water and an angularly coincident depth sensor transducer operating at a second frequency for measuring the depth of the body of water. In another exemplary embodiment, the system and method uses an integrated transducer system comprising a first multi-element transducer array operating at a first frequency for measuring Doppler shifts caused by moving water within a body of water, an angularly coincident depth sensor transducer operating at a second frequency for measuring the depth of the body of water, and a third multi-element transducer array operating at a third frequency for measuring Doppler shifts caused by moving water at greater depths than those measurable at the first frequency. The exemplary embodiments may be used to determine the flow of water through a cross-section of a body of water, such as the discharge of a river.

The features and functions discussed herein can be achieved independently or in combination in various embodiments and aspects, as will be seen with reference to the following description and drawings. Ordinal adjectives such as "first," "second," and "third" are used to distinguish between similar instances of a named element rather than to describe the required number or order of such elements, i.e., "first" and "third" groups of transducers may be present even in the absence of a "second," unless an express statement is made to the contrary.

BRIEF DESCRIPTION OF THE DRAWINGS

The accompanying figures depict various aspects of the system and method. A brief description of each figure is provided below. Elements with the same reference number in each figure indicate identical or functionally similar elements.

FIGS. 1B-1F are schematic diagrams of components of the acoustic subsystem controller 30 element shown in FIG. 1A. FIGS. 1B-A through 1B-E are partial views of FIG. 1B as indicated therein. FIGS. 1C-A and 1C-B are partial views of FIG. 1C as indicated therein. FIGS. 1D-A and 1D-B are partial views of FIG. 1D as indicated therein. FIGS. 1E-A and 1E-B are partial views of FIG. 1E as indicated therein. FIGS. 1F-A and 1F-B are partial views of FIG. 1F as indicated therein.

FIG. 1G is a signal diagram depicting the sampling of analog signals received from transducers operatively connected to an acoustic transceiver operating at a first acoustic frequency, e.g., 0.5 MHz.

DETAILED DESCRIPTION

A multi-frequency, multi-beam acoustic Doppler system may be employed to obtain velocity profiles within a body of water such as a canal, river, narrows, bay, or even open water in order to obtain information such as a discharge profile, current profile, or the like for use in water resources management, riverine and estuarine modeling, navigational mapping, and other applications. In such systems, the ability to employ multiple frequencies of acoustic energy provides a useful means for adapting the data collection process depending upon the type of data to be obtained and the conditions of the acoustic environment. For example, low frequency acoustic energy, such as a 0.5 MHz pulse, may be well suited for use in range finding, and high-frequency acoustic energy, such as a 3.0 MHz pulse, may be well suited for use in Doppler measurement and velocity estimation over range of up to 5 meters, while mid frequency acoustic energy, such as a 1 MHz pulse, may be better suited for Doppler measurement and velocity estimation over an extended range of up to 30 meters, but at the cost of lower sampling frequencies and lower measurement detail.

Acoustic Doppler systems incorporating multi-frequency sensors have heretofore been assembled from multiple independent acoustic systems, in which each acoustic system includes a transducer, a transceiver, and a controller/signal processor which is designed to control a particular transducer or multi-element transducer array for operation at a single acoustic frequency. Such independent systems can be 'combined' by forwarding the data gathered by the systems, such as a velocity profile, altitude-above-bottom, or depth-from-surface, to a general purpose computer for analysis and further processing. However, such a conglomerate of systems cannot readily accommodate multiple systems operating at the same acoustic frequency, where cross-talk between systems caused by side-lobe interference, double and multi-path reflections, and other phenomena may interfere with the measurements made by each system and subsequent data analysis. Such a conglomerate of systems is also prohibitively expensive and bulky, since each acoustic system is, by its nature, designed for independent operation, and must be networked back to yet another independent system, such as a laptop computer, if real-time or semi-real-time information is to be presented to a field operator responsible for directing the aquatic sensor platform or adjusting operations in response to conditions in the aquatic environment.

Figure 1A:
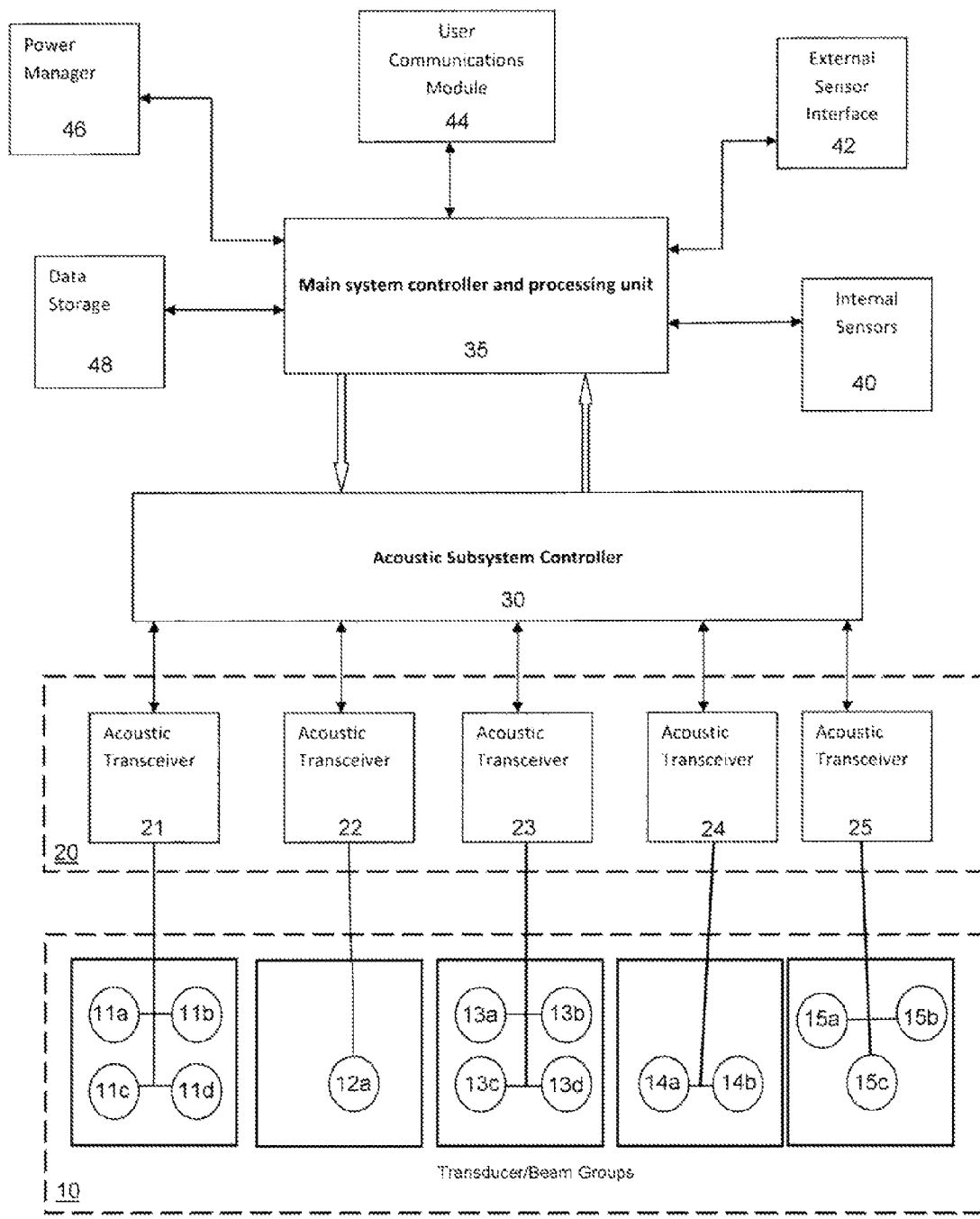
FIG. 1A is a block diagram of an electronics package in one embodiment of the system and method.
Figure 1B:
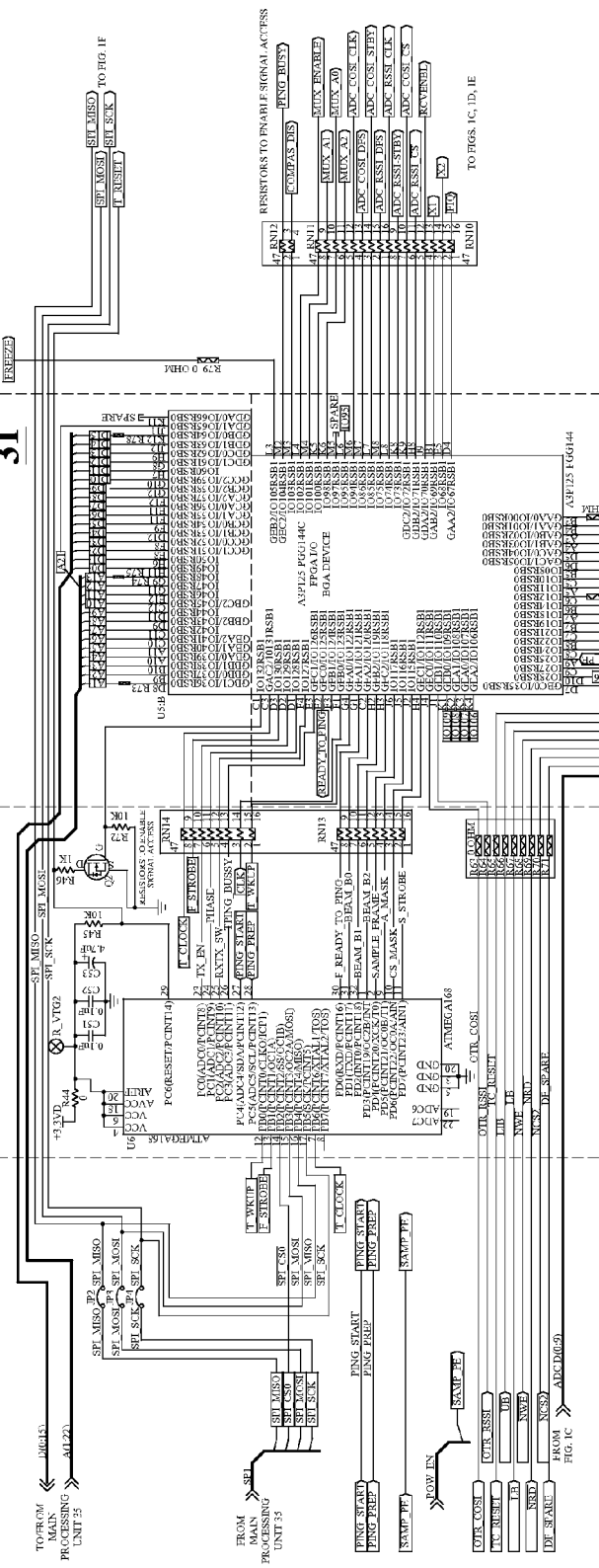
Figure 1D:
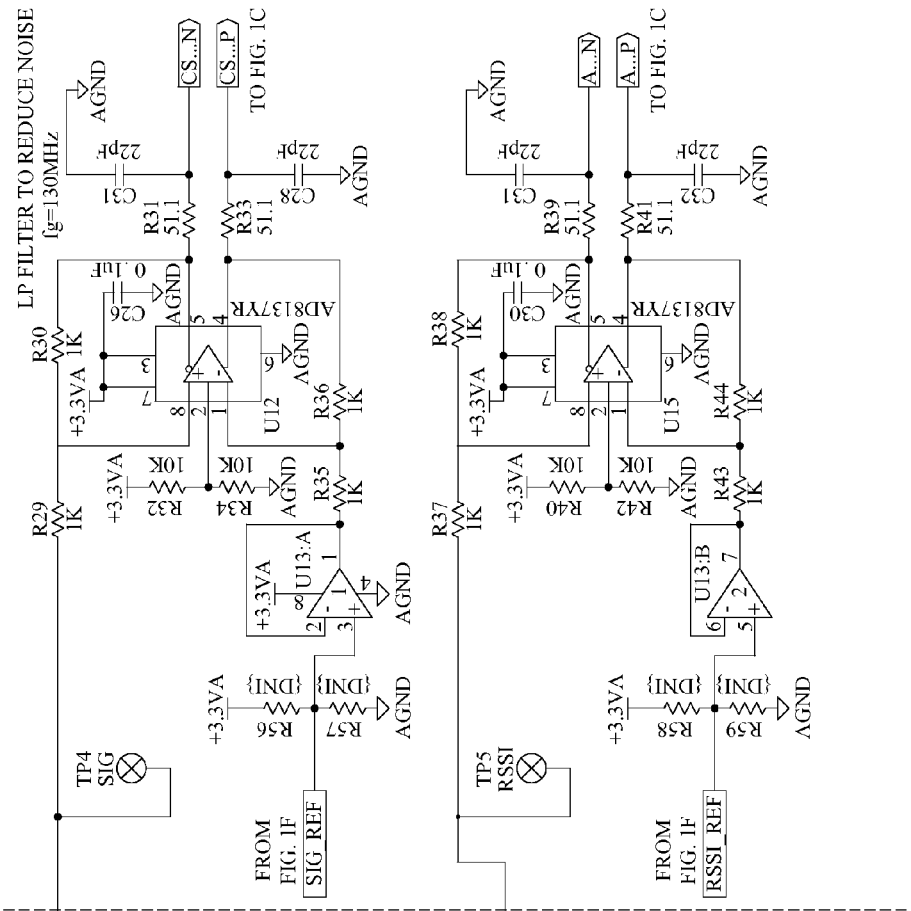
Figure 1D:
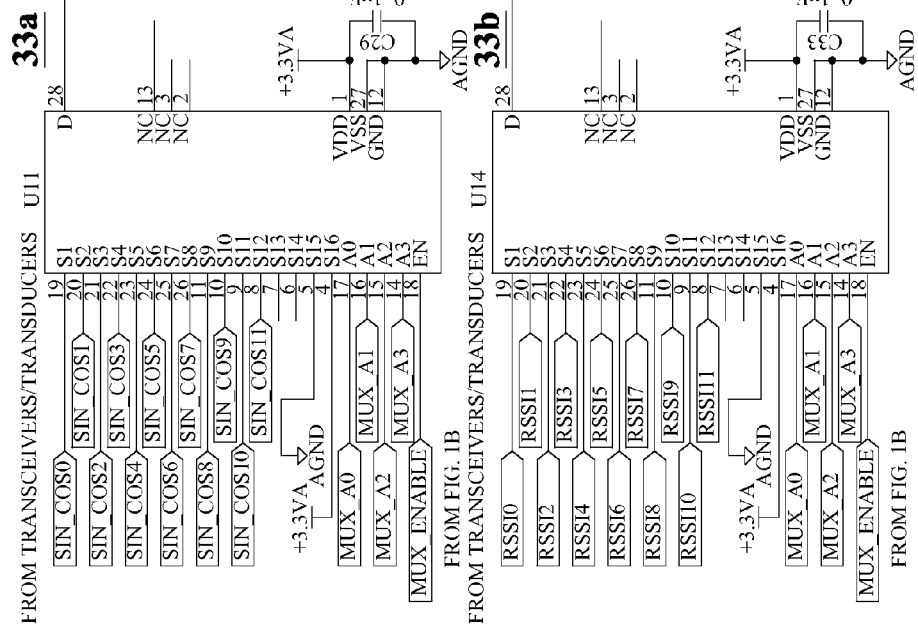
Figure 1E:
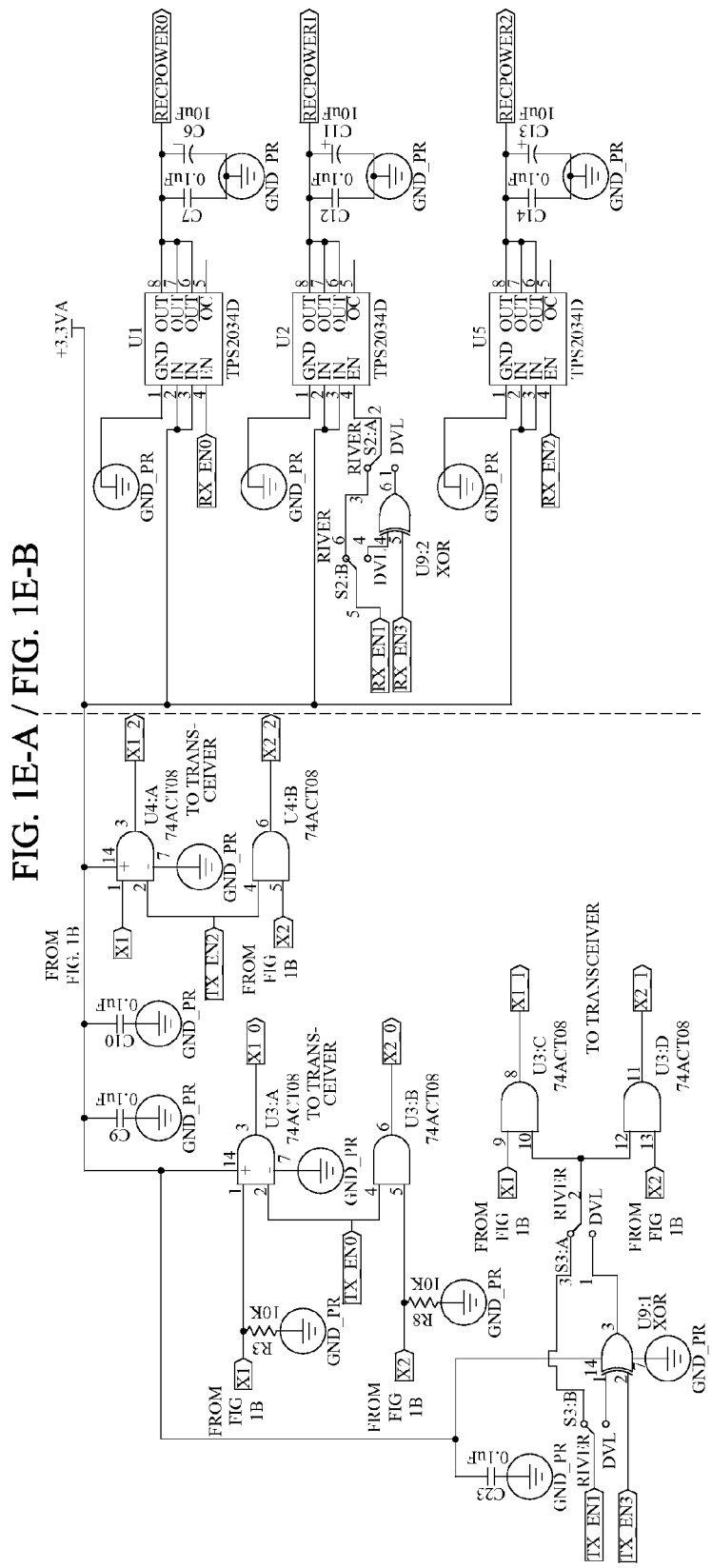

With initial reference to FIG. 1A, the present system and method permits multiple acoustic systems to be more effectively controlled and operated by interconnecting a plurality of acoustic transceivers 20 and groups of transducers 10 through a common acoustic subsystem controller 30. The acoustic subsystem controller 30 is adapted to selectively operate each individual acoustic transceiver. The acoustic subsystem controller 30 is also adapted to pass transceiver signals to a main processing unit 35 including signal processing hardware such as a general purpose processing unit, a digital signal processing unit, and the like, the hardware of the main processing unit being generally known within the art. Notably, a first of the acoustic transceivers 21 may operate at a first acoustic frequency, such as 3 MHz, and be connected to a group of transducers 11a, 11b, 11c, and 11d in a multi-element transducer array for purposes such as Doppler measurement and velocity estimation within a volume generally bounded by the beams of the array, as further described in the exemplary embodiments discussed below. A second of the acoustic transceivers 22, may operate at a second acoustic frequency, such as 0.5 MHz, and be connected to a transducer 12a for purposes such as measuring range to an object within a volume, defined by the acoustic beam, which is angularly coincident with the volume defined by the transducers 11a, 11b, 11c, and 11d, as further described in the exemplary embodiments discussed below. Those of skill will appreciate that references to beams or volumes being "angularly coincident with" other beams or volumes make use of the aquatic sensor platform as a common origin/reference point for the comparison, and that an "object" in this context is any transition between the aquatic medium and a macroscopic medium such as air, earth, metal, or the like including, e.g., the surface of a body of water, the bed of a body of water, the walls of channels or pipes, and marine structures such as buoys, anchoring devices, etc.

The acoustic subsystem controller 30 is preferably modular so that additional acoustic transceivers 20 can be connected through essentially identical hardware in order to add additional frequency capabilities. For example, a third of the acoustic transceivers 23 may operate at a third acoustic frequency, such as 1 MHz, and be connected to a group of transducers 13a, 13b, 13c, and 13d in a multi-element transducer array for purposes such as Doppler measurement and velocity estimation within a volume generally bounded by the beams of the array and angularly coincident with the volume defined by the transducers 11a, 11b, 11c, and 11d. The third transceiver 23 and third group of transducers may be used for purposes such as Doppler measurement and velocity estimation in alternate environmental conditions, such as deeper bodies of water, different types of beds (e.g., rocky or muddy), different types of surfaces (e.g., calm, roiled, or iced over), and different types of acoustic properties (e.g., clear water versus water carrying high loads of suspended solids). Those of skill will also appreciate that the systems described can be used to obtain velocity profiles in essentially any sufficiently large aquatic environment, and may be operated in varying orientations including those described below.

The acoustic subsystem controller 30 is also preferably modular in the sense that the transceivers in the plurality of acoustic transceivers 20 can be independently operated through the acoustic subsystem controller 30 such that groups of transducers 10, e.g., the group 11a, 11b, 11c, and 11d, can be turned off in order to avoid interference or cross-talk both between groups of transducers operating at the same acoustic frequency, e.g., transducers in differently directed transducer sensor groups. Such interference or cross talk may arise when the aquatic sensor platform becomes positioned too close to the boundary of a body of water, e.g., the wall of a canal, or encounters an object which is an efficient reflector of acoustic energy, such as a submerged pipeline.

While additional acoustic transceivers 20 will typically be provided and/or added in order to add additional frequency capabilities, transceivers need not necessarily provide an additional frequency capability. For example, a fourth of the acoustic transceivers 24 may operate at the second acoustic frequency and be connected to a group of transducers 14a and 14b for purposes such as measuring range to objects within volumes, defined by the respective acoustic beams, which are angularly non-coincident with each other. A fifth of the acoustic transceivers 25 may operate either at one of the aforementioned acoustic frequencies or at yet another acoustic frequency with a group of transducers, 15a, 15b, 15c, etc., configured for essentially any known application calling for acoustic sensing and analysis by transducers driven at a common acoustic frequency. Thus, the acoustic subsystem controller 30 and main processing unit 35 permit a number of multi-frequency and/or multi-beam acoustic systems to be controlled, sampled, and summarized to an operator through a single hardware interface. That hardware interface may also include: internal sensors 40 such as pitch and roll sensors, a digital compass, etc.; an external sensor interface 42 for sensors such as a GPS interface, temperature sensors, salinity sensors, etc.; a user communications module 44 for transmission of control signals and/or results over electrically wired, optically wired, radio wireless, and/or acoustic wireless telecommunications connections; a power manager 46 for supplying power to the system, and a data store 48 for recording analysis results, measured data, selected signals from the acoustic transceivers, control signals, hardware states, etc. as desired by the manufacturer and/or field operator.

With reference to FIGS. 1B-1F, the acoustic subsystem controller 30 may comprise a digital circuit configured to sample analog signals received from groups of transducers 10 operatively connected to the plurality of acoustic transceivers 20, the digital circuit sampling the analog signals in pairs having a pair-wise sampling frequency that is four times the operating frequency of the one of the plurality of acoustic transceivers operatively connected to a sampled transducer, i.e., pairs separated by one quarter of the period of the emitted wave (or one quarter of a cycle of the emitted waveform) generated by the associated transceiver. The digital circuit generally includes a logic processor 31 operatively connected to an analog-to-digital converter (A/D converter) 32a, and may include a multiplexor 33a adapted to switch the analog channel sampled by the A/D converter between lines carrying analog signals from individual transducers. In the illustrated aspect shown in FIG. 1B, the logic processor 31 is a Field Programmable Gate Array (FPGA) paired with a microcontroller which controls a reference signal generator 34 (shown in FIG. 1F), but in other aspects the logic processor may itself control the reference signal generator 34, and in still other aspects the logic processor 31 may be an Application Specific Integrated Circuit (ASIC), a high speed general purpose processor, or other equivalent processing means. In the illustrated aspect shown in FIGS. 1C and 1D, the logic processor 31 is operatively connected to a first A/D converter 32a and first multiplexor 33a to sample received signal frequency and phase (i.e., the acoustic frequency, likely Doppler-shifted, of reflected acoustic energy received by a transducer), and to a second A/D converter 32b and second multiplexor 33b to sample received signal strength (i.e., the intensity of reflected acoustic energy received by a transducer). The combination of an FPGA logic processor 31, dual A/D converters 32a and 32b, and dual multiplexors 33a and 33b, permits the circuit to be manufactured from lower speed and more power efficient parts while avoiding the expense of a custom ASIC design.

The acoustic subsystem controller 30 may also be adapted to operatively control the plurality of acoustic transceivers 20 to sound a specified group of transducers 10 for a specified number of pulses having a specified duration and interval, according to instructions in a sampling scheme 54, described in further detail below, otherwise executed by main processing unit 35. In such aspects, the acoustic subsystem controller 30 may include circuitry adapted to direct transceiver control signals generated by the logic processor 31 to a selected one of the plurality of acoustic transceivers 20, with an example of such circuity being shown in FIG. 1E. In the illustrated aspect, the circuity is adapted to direct transceiver control signals generated by the logic processor 31 to the plurality of acoustic transceivers one at a time, in groups, and simultaneously depending upon the operation of transmission-enabling signaling lines "TX_EN[#]" controlled by the logic processor 31 or main processing unit 35. Transmitting lines from the logic processor 31, "X1" and "X2", are connected to transmitting lines to the individual acoustic transceivers, "X1_[#]" and "X2_[#]", in order to allow the logic processor to selectively operate each acoustic transceiver in the plurality of acoustic transceivers 20 independently of the others. A simultaneous operation of transmission-enabling signaling lines also permits the transmitting lines from the logic processor 31 to operate groups of acoustic transceivers or all of the plurality of acoustic transceivers simultaneously.

As shown in FIG. 1G, the digital circuit samples the analog signals received from a sampled transducer, such as transducer 11a, to obtain a pair of digital samples separated by one quarter of the period of the wave emitted during the sounding of that transducer. An exemplary emitted waveform is shown on row A, and an exemplary Doppler-shifted received waveform is shown on row B. The logic processor 31 samples the A/D converter 32a at an integer number of periods of the operating frequency, as determined by the main processing unit 35 and information (supplied by the individual transceiver or entered by a user) concerning the operating frequency of the transceiver and sampled transducer, e.g., transceiver 22 and transducer 12a. Each sample constitutes a pair of values, separated by one quarter of the period of the operating frequency, containing information concerning the received signal frequency and phase. For clarity of illustration, the timing of the sampling of the first member of the pair is shown on row C, and the timing of the sampling of the second member of the pair is shown on row D. By sampling the analog signals received from a sampled transducer at the same frequency as the operating frequency of the transceiver and sampled transducer, the frequency of the emitted waveform is effectively removed, with only the Doppler-shift frequency component being reflected in the resultant digital values. By sampling the analog signals received from a sampled transducer in pairs separated by one quarter of the period of the emitted waveform, the members of the pair may be treated as the cosine (in-phase) and sine (quadrature) components of a Doppler-shift signal. This digital sampling system and method advantageously eliminates the frequency-specific analog quadrature demodulation circuity which is found in prior single frequency acoustic Doppler controller/signal processors. An example of such circuitry is shown and discussed in U.S. Reissue Pat. No. 35,535, the entire contents of which are hereby incorporated by reference. A series of digital values obtained from the A/D converter 33a may be stored within the logic processor 31 and further processed to determine the Doppler frequency of the received acoustic energy, and ultimately the relative velocity of portions of an aquatic medium, according to methods such as those discussed in the referenced patent or otherwise available within the art. In the aspect shown in FIGS. 1C and 1D, where the logic processor 31 samples a second A/D converter 32b and second multiplexor 33b to sample received signal strength, the second A/D converter 32b may be sampled only once per sampling event, for example during the sampling of the first member of the pair, in order to obtain received signal strength information for storage and further processing according to known methods.

The exemplary signals illustrated in FIG. 1G include an exaggerated Doppler shift for ease and clarity of illustration. In practice, the acoustic subsystem controller 30 need not sample the analog signals received from at the sampled transducer once per period of the emitted wave. Instead, the digital circuit may sample the analog signals with a periodic delay between sampling, the delay being a number of periods of the operating frequency of the one of the plurality of the acoustic transceivers. In one aspect, the logic processor 31 samples the A/D converter 32a for an analog signal received from particular transducer to obtain a pair during every eighth period of the emitted wave, i.e., the at a rate that is one eighth of the operating frequency of the one of the plurality of acoustic transceivers operatively connected to a sampled transducer. The number of periods (or time separation between pairs) may be varied in other aspects depending upon the bandwidth of the received analog signal that the manufacturer or a user-operator wishes to resolve during the Doppler velocity measurement process.

Figure 2:
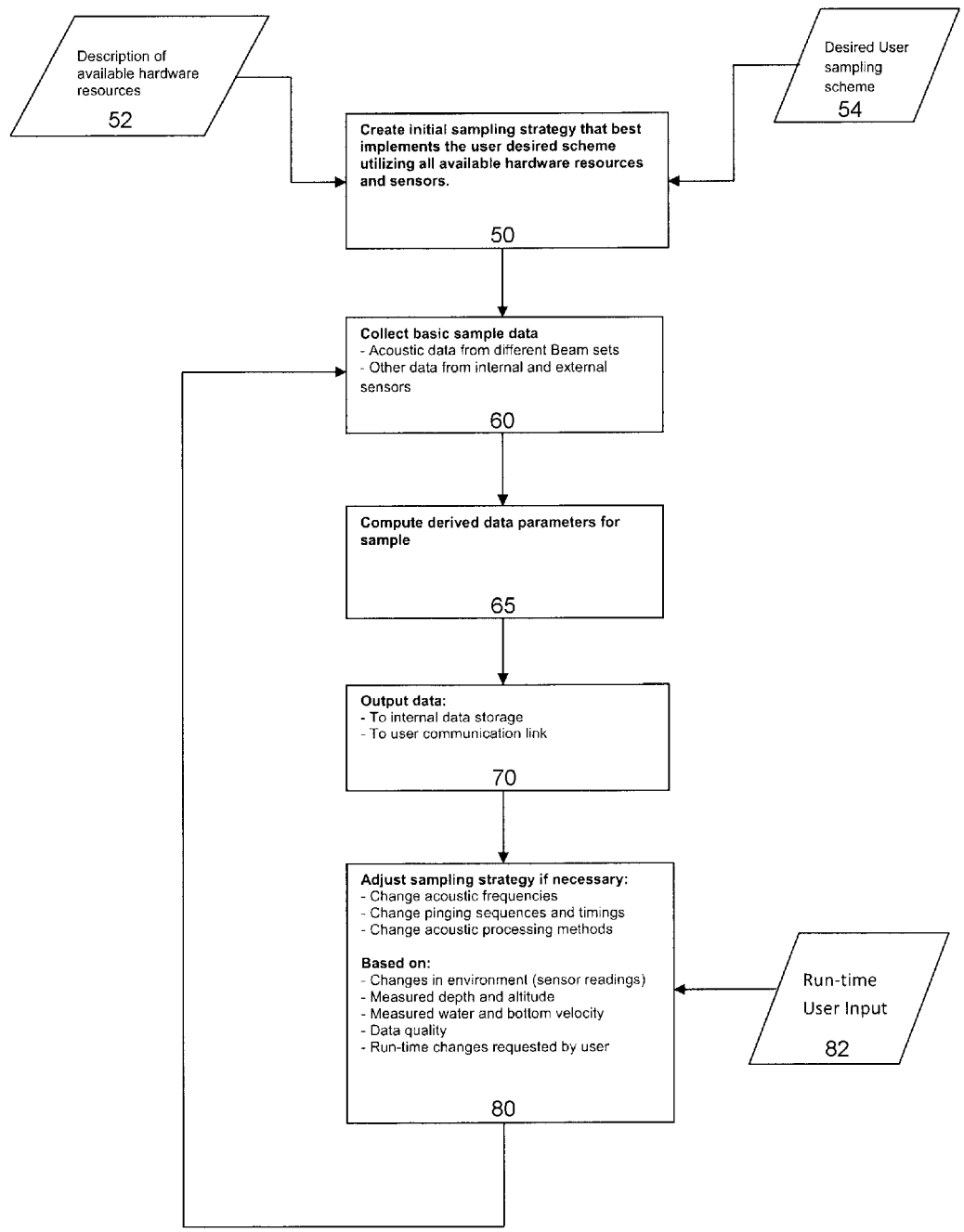
FIG. 2 is a flow chart of an operating procedure in one embodiment of the system and method.

With reference to FIG. 2, the acoustic subsystem controller 30 and main processing unit 35, by virtue of being operatively connected to a plurality of acoustic transceivers 20 and groups of transducers 10 rather than any single group, may be adapted to reorder and optimize the collection of sample data based on conditions within the aquatic environment, even without run-time intervention from the field operator of the system. The system may instead assess the available transceiver/transducer hardware 52 via a user input description and/or, preferably, hardware self-identification using a so-called "plug-and-play" technique, and obtain a user specified sampling scheme 54. The system may then self-create an initial sampling strategy at step 50, implementing the user specified scheme while automatically resolving conflicts among the available transceiver/transducer hardware 52. For instance, it may be desirable to require that transducers 14a and 14b, generating acoustic beams which have the same acoustic frequency but are angularly non-coincident with each other, be operated with delay of a few milliseconds between the pinging of transducer 14a and transducer 14b in order to avoid double reflections, multi-path reflections, and other phenomena which may interfere with measurements and data analysis. Further, it may be desirable to require that transceivers 22 and 24, and the transducers associated therewith, be operated with delay of a few milliseconds between the pinging of transducers 12a, 14a, and 14b in order to avoid side-lobe interference, double and multi-path reflections, and other phenomena that may interfere with the measurements and data analysis across otherwise separate subsystems operating at the same acoustic frequency.

The system may then begin to collect sample data at step 60, based on the user specified sampling scheme 54 and the initial sampling strategy determined at step 50. Signals received from the transceivers 20 and associated transducers 10 are digitized by the acoustic subsystem controller 30, passed to the main processing unit 35, and, in combination with data obtained from the internal sensors 40 and external sensor interface 42, used to compute derived data parameters and analysis results such as a depth or altitude, a velocity estimate, a discharge or current estimate, etc. at step 65. The system may then output at least the derived data and analysis results, collectively the data, at step 70 to the user communications module 44 and/or the data store 48. Notably, by centralizing control and signal processing within the acoustic subsystem controller 30 and main processing unit 35, the system and method may adjust the sampling strategy at step 80. For example, the system may, after sampling transducer 12a, determine that Doppler measurement using only the acoustic transceiver 21 or 23 and associated transducers is unsatisfactory, and adjust the sampling strategy to include Doppler measurement using acoustic transceivers 21 and 23, or vice versa, depending upon factors such as signal quality due to the character of the aquatic medium and/or surface and/or bed, a measured depth or altitude, a measured water or bottom velocity (particularly a bottom velocity indicating rapid movement of the aquatic sensor platform), etc. For further example, the system may, after sampling available transducers, optimize sampling between the transducers by changing pinging sequences and timings in order to avoid side-lobe interference, double and multi-path reflections, and other phenomena while maintaining, where possible, the user specified sampling scheme and desired data resolution. Additionally, the system may change acoustic processing methods such as filtering and correlation schemes. Finally, the system may change any aspect of the sampling strategy and/or computations/processing methods in response to run-time user input 82, such as a change in preferences or a manual override of the system's self-created sampling strategy.

The following are exemplary configurations of the system and method described herein. The features discussed in each example may be achieved independently or in combination in various embodiments and aspects that will not be specifically discussed, and in more complex combinations that will not be specifically discussed, but which are expressly contemplated by this disclosure.

5-Beam Transducer System

Figure 3:
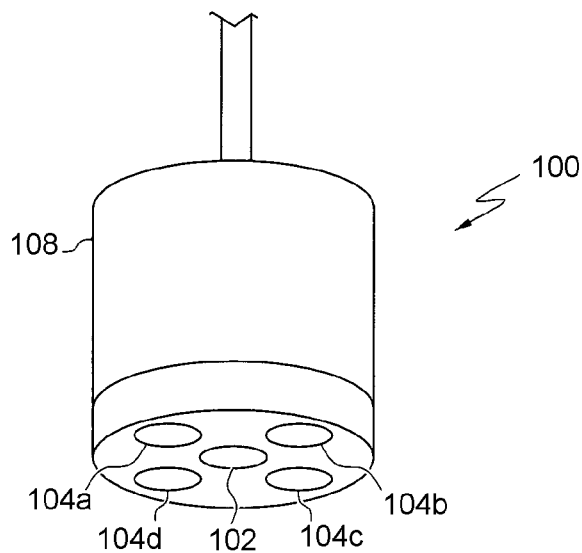
FIG. 3 is an illustration of a 5-beam transducer system employing a 4-beam multi-element transducer array and a single beam transducer in one aspect of the system and method.

Referring now to FIG. 3, a graphical representation of a 5-beam transducer system 100 is presented. The 5-beam transducer system 100 comprises a central beam transducer 102 (similar to transducer 12a, as discussed above) mounted in a housing 108, and a multi-element transducer array 104 including four profile beam transducers 104a, 104b, 104c, and 104d (similar to transducers 11a, 11b, 11c, and 11d, as discussed above) mounted around the central beam transducer 102. In one aspect, the four profile beam transducers are each mounted facing outwardly at about a 25 degree angle from the facing of the central beam transducer 102, and radially distributed around the central beam transducer 102 at an equal interval, so as to bound a volume of the aquatic environment that is generally pyramidal in shape and that is angularly coincident with the volume of the aquatic environment within the central beam. In the illustrated aspect, each profile beam transducer 104a, 104b, 104c, and 104d, is mounted 90 degrees from the adjacent profile beam transducers with respect to the central beam transducer 102, however those of skill will appreciate that as few as three or more than four profile beam transducers may be used for velocity profiling applications. As described above, the multi-element transducer array 104 may be connected to a first acoustic transceiver 21, and the vertical beam transducer 102 may be connected to a second acoustic transceiver 22.

The vertical beam transducer 102 can be operated at lower frequencies in the range of about 100 KHz to 1 MHz and is typically operated as a depth measuring device, but may optionally be operated as an additional Doppler measuring device in order to provide central velocity and acoustic backscattering strength data. In one aspect, the vertical beam transducer 102 is a 10 mm acoustic element operating at a frequency of 1 MHz. The multi-beam transducer array 104 can be operated at frequencies in the range of about 100 KHz to about 5 MHz. In one aspect, the multi-beam transducer array 104 includes four 20 mm acoustic Doppler elements operating at a frequency of 3 MHz. The multi-beam transducer array 104 may be used to perform velocity profiling, position tracking (i.e., determining the speed of the acoustic sensor platform relative to an object in the aquatic environment, particularly the bed of a body water or an ice pack over deep water), and/or wave-field analysis, as well as to estimate a depth or altitude, as variously known in the art. Further description of operations in a rivirine discharge analysis application is provided in the specification attached in Appendix A, but it will be recognized that the device described therein may also be used to collect alternate types of data in alternate applications as described herein.

9-Beam Transducer System

Figure 4:
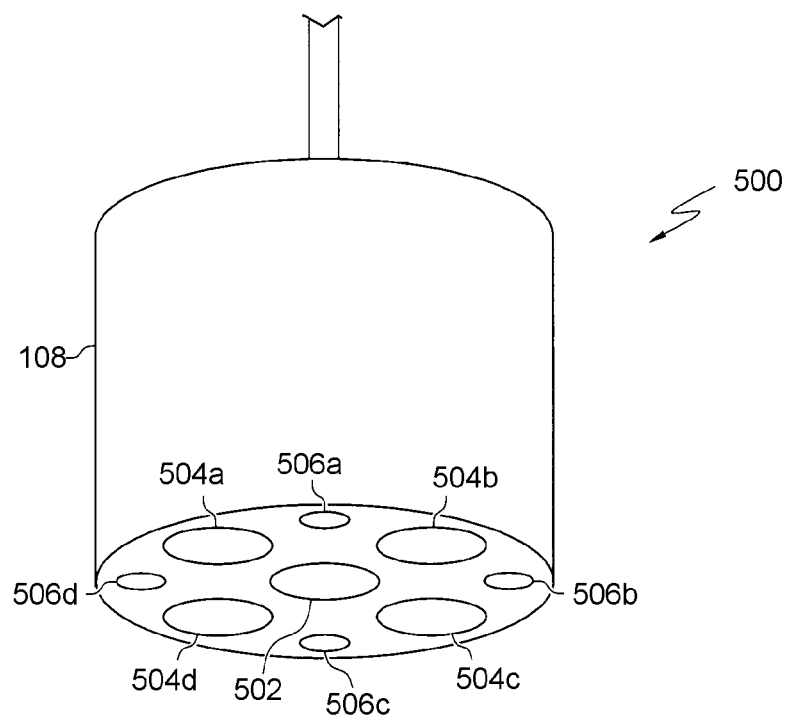
FIG. 4 is an illustration of a 9-beam transducer system employing a first 4-beam multi-element transducer array, and second 4-beam multi-element transducer array, and a single beam transducer in one aspect of the system and method.

Referring now to FIG. 4, a graphical representation of a 9-beam transducer system 500 is presented. The 9-beam transducer system 500 comprises a low frequency central beam transducer 502 (similar to transducer 12a, as discussed above) mounted in a housing 108, a multi-element transducer array 504 of four mid-frequency profile beam transducers 504a, 504b, 504c, and 504d (similar to transducers 13a, 13b, 13c, and 13d, as discussed above) mounted around the low frequency central beam transducer 502, and a multi-element transducer array 506 of four high frequency profile beam transducers 506a, 506b, 506c, and 506d (similar to transducers 11a, 11b, 11c, and 11d, as discussed above) mounted around the low frequency central beam transducer 502. In one aspect, the four mid-frequency profile beam transducers are each mounted facing outwards at about a 25 degree angle from the facing of the central beam transducer 502, and radially distributed around the central beam transducer 502 at an equal interval so as to bound a volume of the aquatic environment that is roughly pyramidal in shape. The four high-frequency profile beam transducers are each mounted facing outwards at about a 25 degree angle from the facing of the central beam transducer 502, and radially interspersed among the mid-frequency profile beam transducers at an equal interval so as to bound a volume of the aquatic environment that is also generally pyramidal in shape and angularly coincident with the volume of the aquatic environment within mid-frequency beams. Both such volumes are angularly coincident with the volume of the aquatic environment within the central beam. Those of skill will appreciate that as few as three or more than four profile beam transducers operating at each frequency may be used for velocity profiling applications. As described above, the multi-element transducer array 506 may be connected to a first acoustic transceiver 21, the central beam transducer 502 may be connected to a second acoustic transceiver 22, and the multi-element transducer array 504 may be connected to a third acoustic transceiver 23.

In one embodiment, the vertical beam transducer 102 is a 30 mm acoustic element operating at a frequency of 0.5 MHz, the multi-beam transducer array 506 includes four 20 mm acoustic Doppler elements operating at a frequency of 3 MHz, and the multi-beam transducer array 504 includes four 30 mm acoustic Doppler elements operating at a frequency of 1 MHz. In operation, the mid-frequency multi-element transducer array 504 may be used to permit measurement over an extended range in comparison to the high-frequency multi-element transducer array 506, however in other aspects the multi-element transducer array 504 may be operated at other acoustic frequencies and used to permit position tracking in other aquatic environments, such as over rocky beds or under ice packs, or used to permit measurements to be taken in different water quality conditions, such as generally clear versus muddy water. Further description of operations in a rivirine discharge analysis application is provided in the specification attached in Appendix A, but it will be recognized that the device described therein may also be used to collect alternate types of data in alternate applications as described herein.

6-Beam Transducer System

Figure 5:
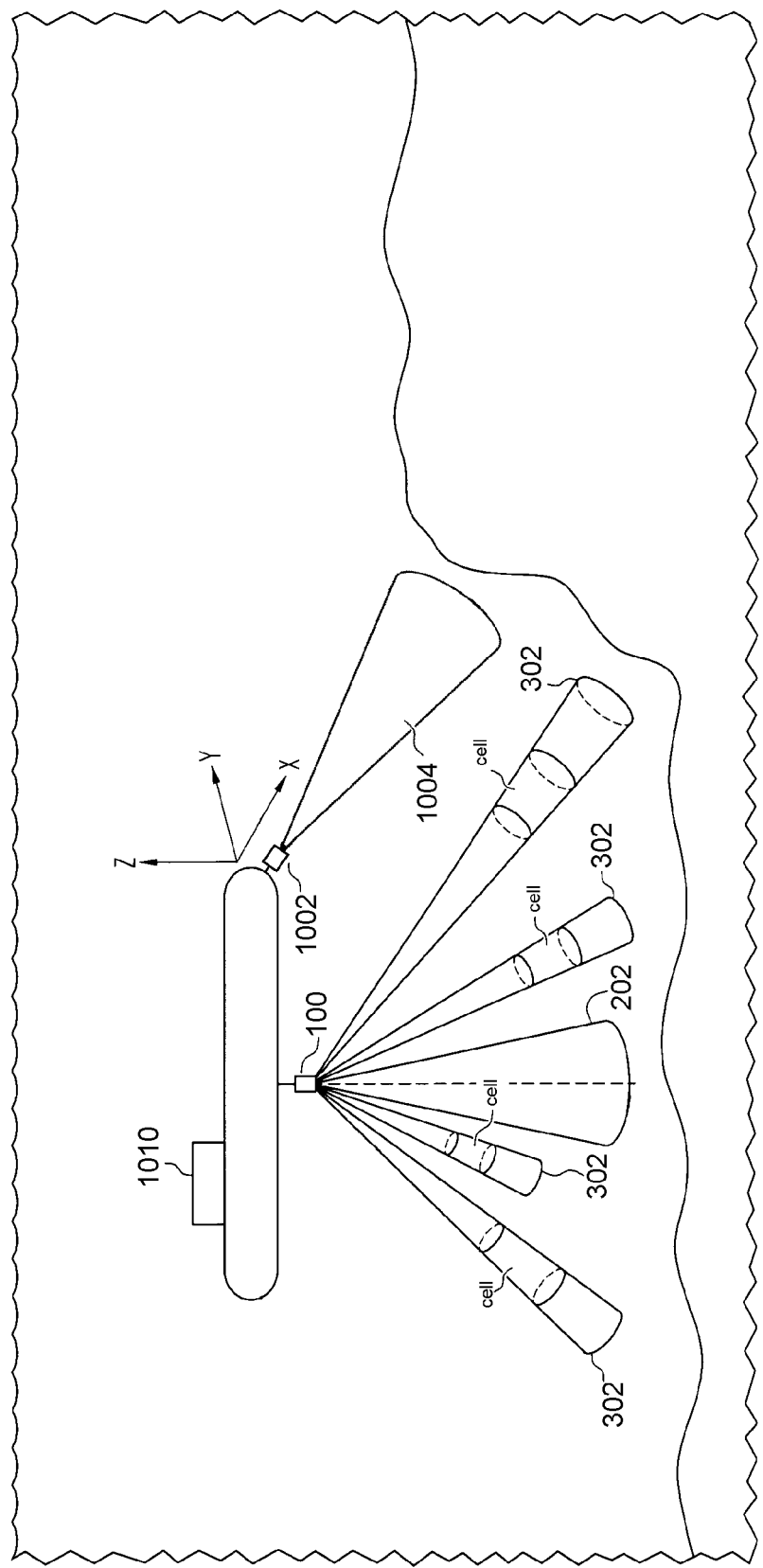
FIG. 5 is an illustration of an additional forward-looking single beam transducer employed in a velocity profiling application.

Referring now to FIG. 5, a graphical representation of a 6-beam transducer system 1000 is presented. The system may employ the exemplary 5-beam transducer system 100 described above, but add a transducer 1002 (similar to transducer 15a, as discussed above) or navigational obstacle avoidance proximate the bow of an aquatic sensor platform 1010 that may be an autonomous or remotely operated vehicle. As shown in the figure, the vehicle may be a submersible or underwater vehicle, but could also be a surface vehicle provided with a sensor to ensure that there is sufficient draft in the direction of travel. The volume of the aquatic environment sampled by the transducer 1002, i.e., within beam 1004, is angularly non-coincident with, or essentially distinct from, the volume of the aquatic environment sampled by the multi-element transducer array 104, i.e., within and between beams 302, as well as that of the vertical beam 102, i.e., within beam 202. However, because the vertical beam transducer 102 and the transducer 1002 may operate at the same acoustic frequency, control of the two transducers through acoustic subsystem controller 30 and main processing unit 35 permits pings from the two transducers to be interleaved more closely together without having to take into account assumed delays, or wait cycles, that would be used in independent acoustic systems to prevent mutual interference. Transducers 102 and 1002 may be operatively connected to separate acoustic transceivers, e.g., first and second instances of transceiver 22, so that beam 202 and beam 1004 may be operated independently of each other.

Although a single transducer 1002 has been discussed and shown, it will be appreciated that multiple transducers or a multi-element array of transducers, e.g., a linear array of transducers such as transducers 15a, 15b, and 15c, as discussed above, may be used to obtain navigational information from an array of bearings with respect to the direction of travel of the aquatic sensor platform 1010. Thus, two, three, or even more sensors may be employed into order to allow for navigational obstacle avoidance without the need to adjust course in order to survey areas outside of the volume sampled by transducer 1002.

7-Beam Transducer System

Figure 6:
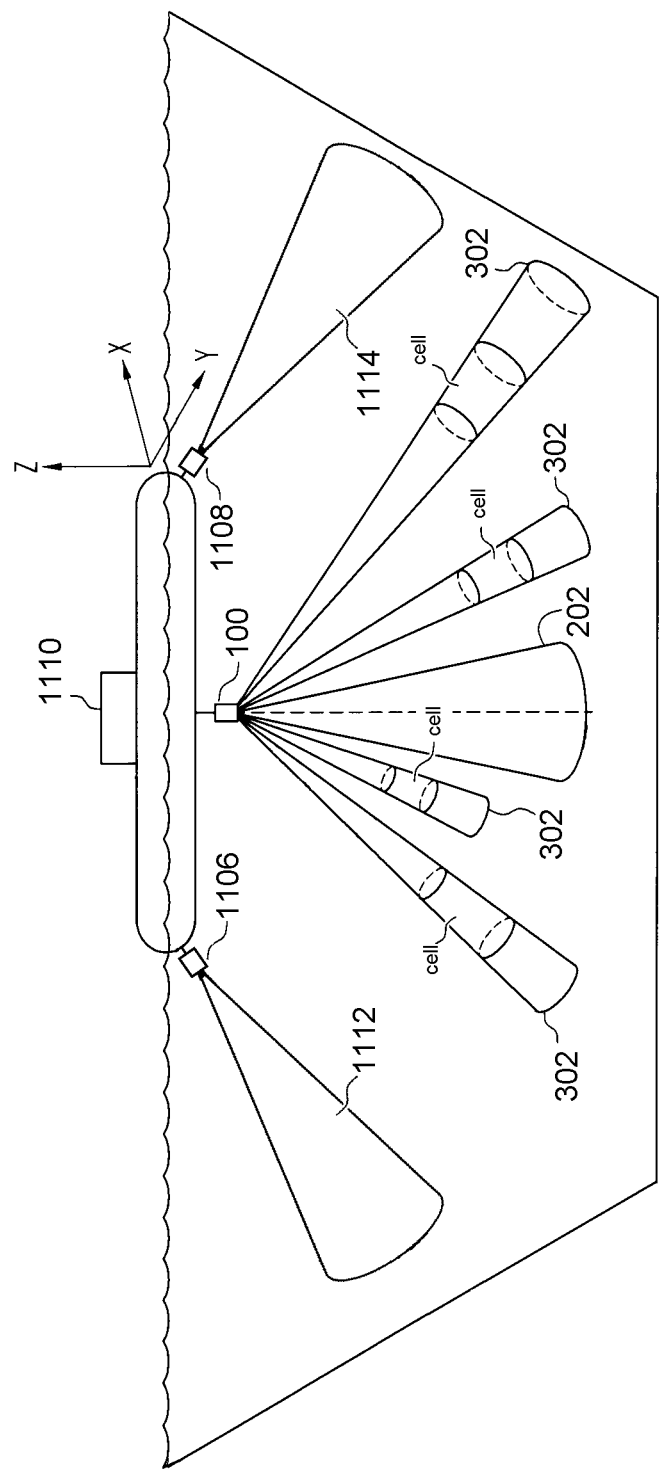
FIG. 6 is an illustration two additional side-looking single beam transducers employed in a velocity profiling application.

Referring now to FIG. 6, a graphical representation of a 7-beam transducer system 1100 is presented. The system may employ the exemplary 5-beam transducer system 100 described above, but add transducers 1106 and 1108 proximate the port and starboard sides of an aquatic sensor platform 1110 for navigational obstacle avoidance, station keeping, or mapping purposes. The acoustic sensor platform 1110 may be an autonomous or remotely operated vehicle, or may be a towed sensor platform. As shown in the figure, the vehicle may be a surface-going sensor platform, but may alternately be a submersible or underwater sensor platform depending upon the particular application. The volumes of the aquatic environment sampled by the transducers 1106 and 1108, i.e., within beams 1112 and 1114, respectively, are angularly non-coincident with, or essentially distinct from, the volume of the aquatic environment sampled by the multi-element transducer array 104, i.e., within and between beams 302, as well as that of the central beam 102, i.e., within beam 202. The volumes of the aquatic environment sampled by the transducers 1106 and 1108 are also angularly non-coincident with each other. Transducers 1106 and 1108 are preferably operatively connected to separate acoustic transceivers, e.g., additional instances of transceiver 22, so that beam 202 and beams 1112 and 1114 may be operated independently of each other, although it will be appreciated that transducers 1106 and 1108 need not be operated at the same acoustic frequency as transducer 102.

Transducers 1106 and 1108 are shown in an orientation which may be suited for station keeping within a canal or similar channel, where it may be a goal to maintain position relative to the banks of the body of water in order to collect data which is coherent along the predominant direction of flow. However, transducers 1106 and 1108 may be instead oriented at any angle from the horizontal in a side-looking mapping application, or additionally angled toward the bow of the aquatic sensor platform 1110 in a navigational obstacle avoidance application as discussed in the context of the prior example. As before, since the vertical beam transducer 102 and the transducers 1106 and 1108 may operate at the same acoustic frequency, control of these transducers through acoustic subsystem controller 30 and main processing unit 35 permits pings from the transducers to be interleaved more closely together without having to take into account assumed delays, or wait cycles, that would be used in independent acoustic systems to prevent mutual interference.

Although a two transducers 1106 and 1108 have been discussed and shown, it will be appreciated that multiple transducers or a multi-element array of transducers, e.g., a linear array, may be sideways-looking in order to obtain navigational information from an array of bearings with respect potential directions of travel and/or drift of the aquatic sensor platform 1110. Thus, more sensors may be employed into order to allow for navigational obstacle avoidance when maneuvering with thrusters, reversing a direction of travel, etc. during operations within natural and manmade aquatic environments.

10-Beam Transducer System

Figure 7:
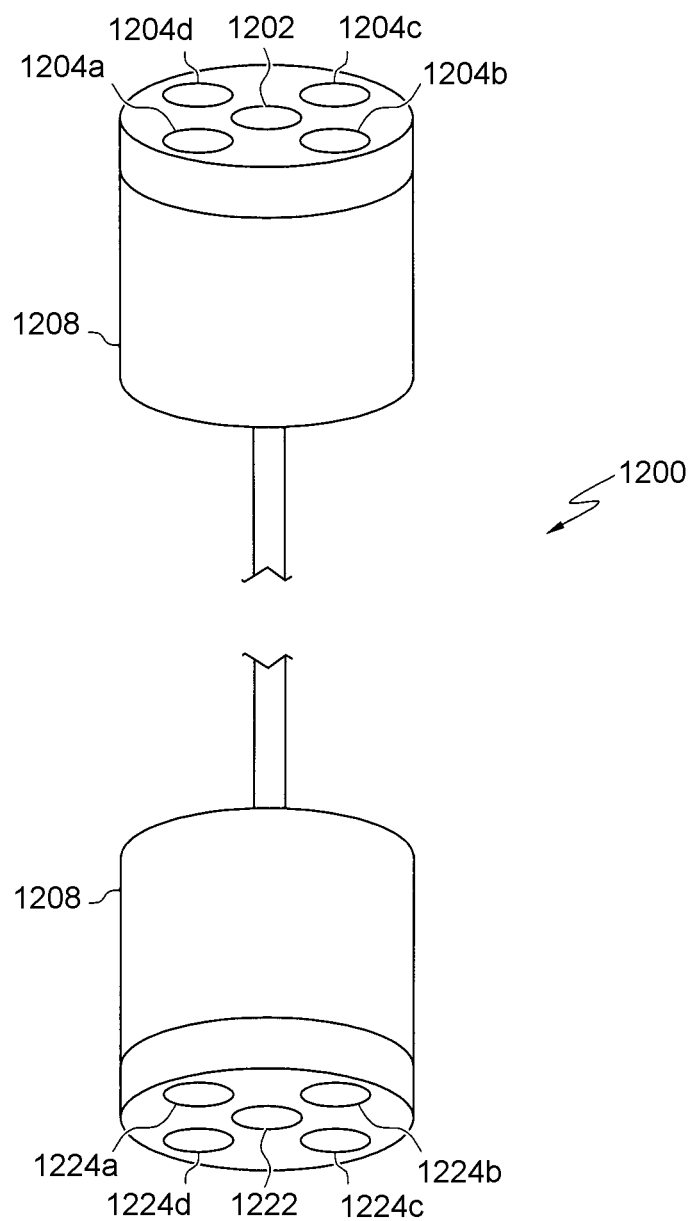
FIG. 7 is an illustration of a 10-beam transducer system employing an upwardly oriented 4-beam multi-element transducer array/single beam transducer sensor group and a downwardly oriented 4-beam multi-element transducer array/single beam transducer sensor group in one aspect of the system and method.
Figure 8:
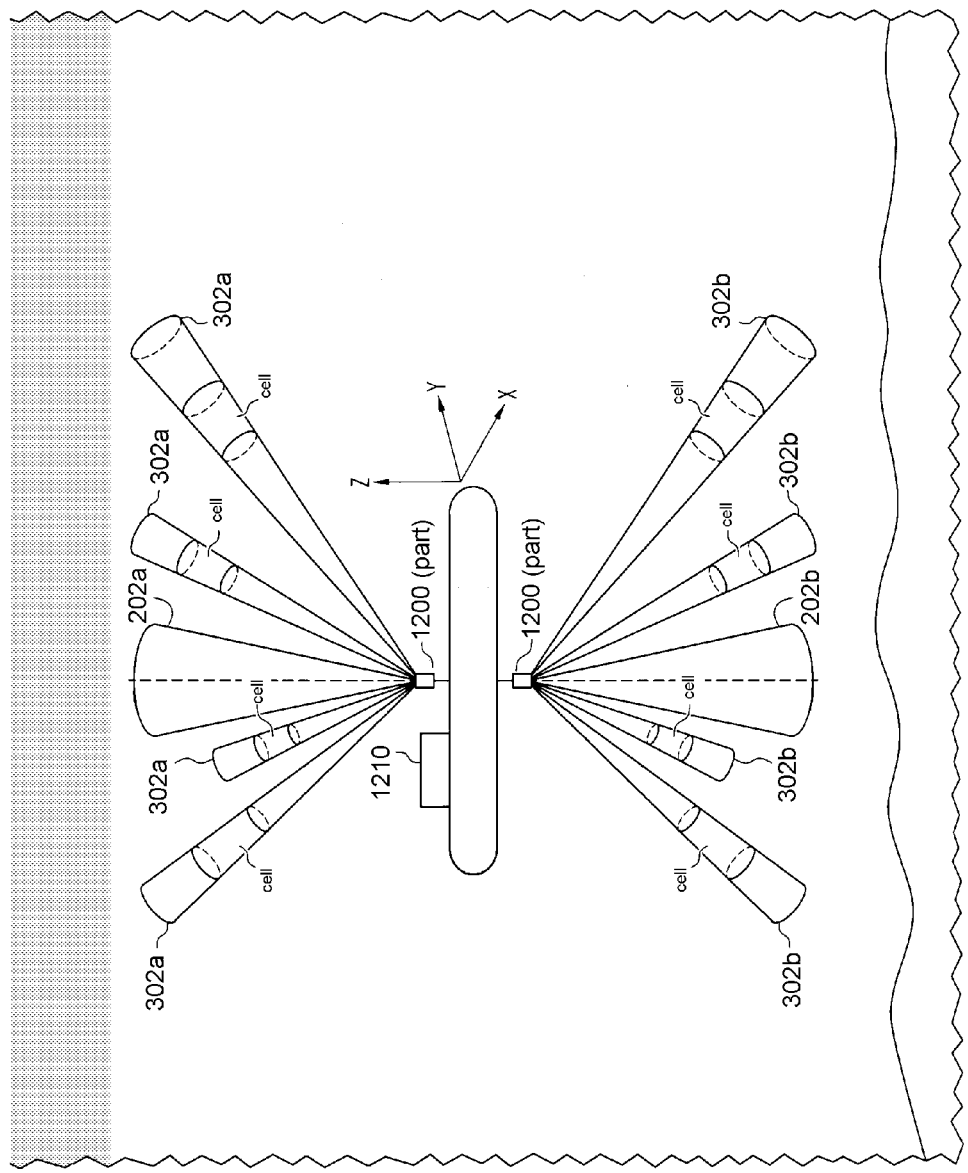
FIG. 8 is an illustration of an application where the acoustic sensor platform is a submersible vehicle, and two generally oppositely directed multi-element transducer arrays are employed in a velocity profiling application.

Referring now to FIGS. 7 and 8, a graphical representation of a 10-beam transducer system 1200 is presented. The 10-beam transducer system 1200 may generally comprise central beam transducers 1202 and 1222 each mounted in a housing 1208, and multi-element transducer arrays 1204 and 1224 each including four profile beam transducers 1204a-d and 1224a-d mounted around the respective central beam transducers 1202 and 1222. In one aspect, the four profile beam transducers are each mounted facing outwards at about a 25 degree angle from the respective central beam transducer, and radially distributed around the that central beam transducer at an equal interval, so as to bound a volume of the aquatic environment that is generally pyramidal in shape, i.e., within and between beams 302a or 302b, respectively, and angularly coincident with the volume of the aquatic environment within the central beam, i.e., within beam 202a or 202b, respectively. As illustrated, the central beam transducer 1202 may be upward facing, with the multi-element transducer array 1204 being generally upward facing, and the central beam transducer 1222 may be downward facing, with the multi-element transducer array 1224 being generally downward facing. Those of skill will appreciate that as few as three or more than four profile beam transducers may be used for velocity profiling applications, that the central beam transducers 1202 and 1222 are not required elements of the sensor groups, and the sensor groups are not required to be oppositely facing. As described above, the multi-element transducer arrays 1204 and 1224 may be connected to a first acoustic transceiver 21, and the central beam transducers 1202 and 1222 may be connected to a second acoustic transceiver 22. However, the multi-element transducer arrays 1204 and 1224 may be connected to separate acoustic transceivers 21 and 21a (essentially duplicating 21 but not shown), and central beam transducers 1202 and 1222 may be connected to separate acoustic transceivers 22 and 22a (essentially duplicating 22 but not shown), in order to allow for reuse of acoustic transceiver electronics developed for other aspects such as the 5-beam transducer system described above. In addition, it will be apparent that housing 1208 may be one housing, two separate housings, or merely a particularly configured section of the hull of an aquatic sensor platform 1210, depending upon the desired orientations of the respective transducer subgroups 1202/1204 and 1222/1224 and the configuration of the aquatic sensor platform 1210.

The central beam transducers 1202 and 1222 can be operated at frequencies in the range of about 100 KHz to 1 MHz and are typically operated as depth and altimetry measuring devices, but may optionally be operated as additional Doppler measuring devices in order to provide additional central velocity and acoustic backscattering strength data. In one aspect, the central beam transducers 1202 and 1222 may be 30 mm acoustic elements operating at a frequency of 0.5 MHz. The multi-beam transducer arrays 1204 and 1224 can be operated at frequencies in the range of about 100 KHz to about 5 MHz. In one aspect, the multi-beam transducer arrays 1204 and 1224 may each include four 20 mm acoustic Doppler elements operating at a frequency of 3 MHz. In another aspect, the multi-beam transducer arrays 1204 and 1224 may each include four 30 mm acoustic Doppler elements operating at a frequency of 1 MHz. The multi-beam transducer arrays may be used to perform velocity profiling, position tracking (i.e., determining the speed of the acoustic sensor platform relative to an object in the aquatic environment, particularly a bed and overlying ice pack in shallow water), and analysis of the motion between objects in the aquatic environment.

In variations of this example, the multi-beam transducer arrays 1204 and 1224 may operate at different acoustic frequencies. For example, in a submersible aquatic sensor platform 1210, the multi-beam transducer array 1204 may include four 30 mm acoustic Doppler elements operating at a frequency of 1 MHz for the purpose of obtaining velocity profile and wave-field analysis data, but the multi-beam transducer array 1224 may include four 20 mm acoustic Doppler elements operating at a frequency of 3 MHz for the purpose of obtaining velocity profile and sediment transport analysis data. In such an application, the aquatic sensor platform 1210 may station keep, rest, or even be temporarily anchored in the sediment bed, and the multi-beam transducer array 1224 may itself be used to measure and/or estimate altimetry (through independent measurements of altitude with respect to each angled beam and/or an estimate of a central value derived from the independent measurements), so that central transducer 1222 is optional and may be omitted.

Other Transducer Systems

Various applications may substitute a 4-beam transducer system lacking a central beam transducer, a 9-beam transducer system including a second multi-element transducer array, or other suggested variants may be substituted for the 5-beam transducer system/sensor group and 4-element multi-element transducer array used as a common basis for description and explanation in the aforedescribed exemplary applications. Those of skill will appreciate that a reasonably arbitrary number of transducers and/or multi-element transducer arrays, driven by a plurality of acoustic transceivers collectively operating at a plurality of different acoustic frequencies, and operatively connected through a common acoustic subsystem controller to a common main processing unit, may be more usefully employed in order to gather data from essentially distinct volumes of the aquatic environment oriented around an aquatic sensor platform, depending upon the needs of the particular application.

The acoustic Doppler systems and embodiments discussed herein may be employed in a variety of applications. An exemplary application, the measurement and estimation of the discharge of a river or other moving body of water, is specifically discussed in the parent of this application, U.S. application Ser. No. 12/340,315, the disclosure of which is incorporated by reference. Those of skill in the art will appreciate that the systems and methods described herein may, as mentioned above, be used to obtain velocity profiles within a variety of environments such as a canal, river, narrows, bay, or open water; with a variety of orientations such as downward-facing, upward facing, and horizontally facing; and on a variety of acoustic sensor platforms, whether fixed or mobile, in order to obtain velocity profile information.

The embodiments of the invention shown in the drawings and described above are exemplary of numerous embodiments that may be made within the scope of the appended claims. It is contemplated that numerous other configurations of the system and method, and other applications of the device employing various combinations and orientations of transducers and multi-element transducer arrays, may be created based on recombinations of the disclosed approach and examples. It is the applicant's intention that the scope of the patent issuing herefrom will be limited only by the scope of the claims.

What is claimed is:

1. An acoustic Doppler system comprising:
   an acoustic subsystem controller operatively connected to a plurality of acoustic transceivers;
   a first of the plurality of acoustic transceivers, operating at a first acoustic frequency, which is operatively connected to a first group of at least one transducer; and
   a second of the plurality of acoustic transceivers, operating at a second acoustic frequency, which is operatively connected to a second group of at least one transducer;
   wherein the acoustic subsystem controller comprises a digital circuit configured to sample analog signals received from each transducer of the first group of at least one transducer and each transducer of the second group of at least one transducer, the digital circuit sampling the analog signal received from a sampled transducer in a sampling pair having a pairwise sampling frequency that is four times the operating frequency of the one of the plurality of acoustic transceivers operatively connected to the sampled transducer.

2. The acoustic Doppler system of claim 1, wherein the digital circuit repeatedly samples the analog signal received from the sampled transducer with a periodic delay between sampling pairs, the periodic delay being an integer number of periods of the operating frequency of the one of the plurality of the acoustic transceivers operatively connected to the sampled transducer.

3. The acoustic Doppler system of claim 1, wherein the acoustic subsystem controller further comprises a multiplexor adapted to switch an analog channel sampled by the digital circuit between multiple analog channels, each of the multiple analog channels being associated with an individual transducer.

4. The acoustic Doppler system of claim 1, wherein the acoustic subsystem controller is adapted to selectively operate each acoustic transceiver in the plurality of acoustic transceivers independently of the others of the plurality of acoustic transceivers.

5. The acoustic Doppler system of claim 4, wherein the acoustic subsystem controller is adapted to selectively operate each acoustic transceiver in the plurality of acoustic transceivers one at a time, in groups, and simultaneously.

6. An acoustic Doppler system comprising:
   an acoustic subsystem controller mounted on an aquatic sensor platform and operatively connected to a plurality of acoustic transceivers;
   a first of the plurality of acoustic transceivers, operating at a first acoustic frequency, which is operatively connected to a first multi-element transducer array adapted to measure three dimensional motion within a first volume of aquatic environment; and
   a second of the plurality of acoustic transceivers, operating at a second and different acoustic frequency, which is operatively connected to a first transducer adapted to measure range to an object within a volume of aquatic environment angularly coincident with the first volume;
   wherein the acoustic subsystem controller is adapted to selectively operate each of the first and second acoustic transceivers and to sample analog signals received by the first multi-element transducer array, with an analog signal from each individual transducer in the multi-element transducer array being sampled in a sampling pair, the members of the sampling pair being separated by one quarter of the period of an emitted acoustic wave generated by the associated acoustic transceiver.

7. The acoustic Doppler system of claim 6, further comprising:
   a third of the plurality of acoustic transceivers, operating at a third and different acoustic frequency, which is operatively connected to a second multi-element transducer array adapted to measure three dimensional motion within a volume of aquatic environment angularly coincident with the first volume;
   wherein the acoustic subsystem controller is further adapted to selectively operate the third acoustic transceiver and to sample analog signals received by the second multi-element transducer array using said sampling pairs.

8. An acoustic Doppler system comprising:
   an acoustic subsystem controller mounted on an aquatic sensor platform and operatively connected to a plurality of acoustic transceivers;
   a first of the plurality of acoustic transceivers, operating at a first acoustic frequency, which is operatively connected to a first multi-element transducer array adapted to measure three dimensional motion within a first volume of aquatic environment; and
   a second of the plurality of acoustic transceivers, operating at a second and different acoustic frequency, which is operatively connected to a first transducer adapted to measure range to an object within a volume of aquatic environment angularly non-coincident with the first volume;
   wherein the acoustic subsystem controller is adapted to selectively operate each of the first and second acoustic transceivers and to sample analog signals received by the first multi-element transducer array, with an analog signal from each individual transducer in the multi-element transducer array being sampled in a sampling pair, the members of the sampling pair being separated by one quarter of the period of an emitted acoustic wave generated by the associated acoustic transceiver.

9. A method of sampling acoustic Doppler signals received from a plurality of acoustic transceivers, wherein a first of the plurality of acoustic transceivers, operating at a first acoustic frequency, is operatively connected to a first group of at least one transducer, and a second of the plurality of acoustic transceivers, operating at a second and different acoustic frequency, is operatively connected to a second group of at least one transducer; the method comprising the steps of:
- a.) sampling an analog signal received from a sampled transducer in the first group of at least one transducer, the sample comprising a pair of values taken with a pair-wise sampling frequency that is four times the operating frequency of the first of the plurality of acoustic transceivers;
- b.) sampling an analog signal received from a sampled transducer in the second group of at least one transducer, the sample comprising a pair of values taken with a pair-wise sampling frequency that is four times the operating frequency of the second of the plurality of acoustic transceivers;
- c.) processing the pairs of values as components of Doppler velocity estimates, the members of the pairs representing the cosine and sine components of a Doppler-shift signal.

10. The method of claim 9, further comprising the step of:
- d.) repeatedly sampling the analog signal received from the sampled transducer with a periodic delay between sampling pairs, the periodic delay being an integer number of periods of the operating frequency of the one of the plurality of the acoustic transceivers operatively connected to the sampled transducer.

\* \* \* \* \*